(12) United States Patent
Smith

(10) Patent No.: US 11,748,962 B2
(45) Date of Patent: *Sep. 5, 2023

(54) RESILIENT INTERDEPENDENT SPATIAL ALIGNMENT TO IMPROVE AND MAINTAIN SPATIAL ALIGNMENT BETWEEN TWO COORDINATE SYSTEMS FOR AUGMENTED REALITY AND OTHER APPLICATIONS

(71) Applicant: Argyle Inc., Portland, OR (US)

(72) Inventor: Logan Smith, Portland, OR (US)

(73) Assignee: Argyle Inc., Portland, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/813,902

(22) Filed: Jul. 20, 2022

(65) Prior Publication Data
US 2023/0029459 A1    Feb. 2, 2023

Related U.S. Application Data

(63) Continuation of application No. 17/389,151, filed on Jul. 29, 2021, now Pat. No. 11,430,193.

(51) Int. Cl.
*G06T 19/00* (2011.01)
*G06T 19/20* (2011.01)
*G06T 15/20* (2011.01)
*G06T 15/08* (2011.01)

(52) U.S. Cl.
CPC ............ *G06T 19/006* (2013.01); *G06T 15/08* (2013.01); *G06T 15/20* (2013.01); *G06T 19/20* (2013.01); *G06T 2219/008* (2013.01); *G06T 2219/2016* (2013.01)

(58) Field of Classification Search
None
See application file for complete search history.

(56) References Cited

U.S. PATENT DOCUMENTS

| 10,724,863 | B2 | 7/2020 | Vasilyuk et al. |
| 11,127,373 | B2 | 9/2021 | Wan et al. |
| 2021/0199460 | A1 | 7/2021 | Yerli |

*Primary Examiner* — Robert J Craddock
(74) *Attorney, Agent, or Firm* — McCoy Russell LLP

(57) ABSTRACT

A computer-implemented method implements a resilient interdependent spatial alignment (RISA) process to improve and maintain spatial alignment between two associated coordinate systems by moving a follow coordinate system to align it to a lead coordinate system. In some use cases, the coordinate systems may be a physical space and a corresponding digital model of the space. A user device such as an augmented reality headset or robotic sensors may be moving in the physical space, and alignment to the model is continually maintained, updated and improved responsive to acquired spatial data to enable, for example, holographic display of the model in the headset very closely aligned to the physical space. Multiple volumes can each have corresponding digital "spaces" or RisaSites to manage anchor data with dynamic hand-off among them while accommodating differing scale and density.

17 Claims, 21 Drawing Sheets

RESILIENT INTERDEPENDENT SPATIAL ALIGNMENT TO IMPROVE AND MAINTAIN SPATIAL ALIGNMENT BETWEEN TWO COORDINATE SYSTEMS FOR AUGMENTED REALITY AND OTHER APPLICATIONS

CROSS-REFERENCE TO RELATED APPLICATIONS

The present application is a continuation of U.S. Utility patent application Ser. No. 17/389,151, titled "RESILIENT INTERDEPENDENT SPATIAL ALIGNMENT TO IMPROVE AND MAINTAIN SPATIAL ALIGNMENT BETWEEN TWO COORDINATE SYSTEMS FOR AUGMENTED REALITY AND OTHER APPLICATIONS," filed on Jul. 29, 2021. The entire contents of the above-identified application is hereby incorporated by reference for all purposes.

COPYRIGHT NOTICE

©2020-2021 Argyle Inc. A portion of the disclosure of this patent document contains material which is subject to copyright protection. The copyright owner has no objection to the facsimile reproduction by anyone of the patent document or the patent disclosure, if and when it appears in the Patent and Trademark Office public records, but otherwise reserves all copyright rights whatsoever. 37 CFR § 1.71(d).

TECHNICAL FIELD

This application pertains to tools and techniques to improve resiliency and accuracy of spatial alignment of a digital model to a corresponding leadSpace, especially in dynamic physical locations.

BACKGROUND

Augmented reality (AR) often uses SLAM (Simultaneous Location and Modeling). This is a base technology for augmented reality applications where a device has some means of looking at a physical area or scene, for example, cameras or other sensors, and "seeing" based on typically a set of "feature points," high contrast points that are in view. SLAM determines that the device has moved over, for example, a quarter of an inch since the last frame. So, it is continuously collecting and processing information about the scene based on feature points. An "object" in the sense of a physical chair or a speaker may be represented digitally as a collection or "cloud" of feature points. Technologies are known to associate a specific location or object in the physical space with its digital twin counterpart based in part on matching feature points.

Spatial Anchors is a term used by Microsoft and others to refer to links to tie together the physical and the virtual. It is part of a set of Azure cloud services. Spatial Anchors (or simply, anchors) are a way to designate and recall precise points of interest across platforms. That is, anchors are accessible across smartphones, AR glasses, etc. To create an anchor, a device (including a processor to execute code and interact with cloud resources) looks at an area and scans for all of those feature points that it's been using for SLAM and takes a "cloud" of them, perhaps hundreds of feature points, and then declares one point somewhere in that cloud as an anchor point. The anchor point may be considered the origin for the cloud feature point vectors. That anchor data may be stored over the internet to remote computing resources. At a minimum, each feature point in the corresponding cloud may have a color value and location data. So, in the physical chair example, the origin of the point cloud may be considered the "location" of the chair.

Mobile devices, for example, a smartphone, tend to use inertia combined with their RGB camera and it processes those together and generates a new pose every frame. The term IMU stands for "Inertial Measurement Unit," and we use it to describe a collection of measurement tools. When installed in a device, these tools can capture data about the device's movement. IMUs may contain sensors such as accelerometers, gyroscopes, and magnetometers. Some AR headsets may lack inertial sensors but have more sophisticated cameras such as infrared sensors. Further, these devices can provide a feed of data regarding the feature points, for example, as a 3D map of them. Thus, the 3D points support mapping or modeling of the environment.

In computer vision and robotics, a typical task is to identify specific objects in an image and to determine each object's position and orientation relative to some coordinate system. This information can then be used, for example, to allow a robot to manipulate an object or to avoid moving into the object. The combination of position and orientation is referred to as the "pose" of an object, even though this concept is sometimes used only to describe the orientation. The image data from which the pose of an object is determined can be either a single image, a stereo image pair, or an image sequence where, typically, the camera is moving with a known velocity. The objects which are considered can be rather general, including a living being or body, parts, e.g., a head or hands. The methods which are used for determining the pose of an object, however, are usually specific for a class of objects and cannot generally be expected to work well for other types of objects. The pose can be described by means of a rotation and translation transformation which brings the object from a reference pose to the observed pose.

One problem with AR inspections or other AR activities at a building site or other dynamic location (say, marking locations for structural elements to be installed) is that the digital twin (generally a 3D model of the project) must be accurately aligned to the actual physical space in view, despite changes in the scene over time (construction is ongoing) and inaccuracies in the AR data due to drift. Moreover, many locations, for example, construction sites, are very dynamic. Physical materials and structures and frequently added, removed, and relocated. Therefore, points of association can disappear after a current session is concluded. This can cause anchors to no longer match the physical world, so association and persistence are gone.

The need remains for a way to accurately and dynamically re-align or adjust alignment of two related coordinate systems to correct for drift and changes in the subject environment. As one example, the disclosed processes may be used to align a digital model to the corresponding physical scene in view of a user's AR device.

SUMMARY OF THE DISCLOSURE

The following is a summary of the present disclosure to provide a basic understanding of some features and context. This summary is not intended to identify key/critical elements of the present disclosure or to delineate the scope of the disclosure. Its sole purpose is to present some concepts of the present disclosure in a simplified form as a prelude to the more detailed description that is presented later.

This description proceeds in two parts. First, we describe methods to align two associated coordinate systems. The disclosed process aligns two spaces, or more specifically aligns their coordinate systems, by determining how to reposition one of them (the follow space or "followSpace") to align it to the other (the leadSpace), typically in 3D space. The repositioning typically comprises translation and rotation steps. By aligning the two spaces, they will then have a common origin location, and orientation. This alignment process preferably is implemented in software, for example, as a function or method that can be called by other software. We refer to this process generally as "PVA"—an acronym for Point-Vector-Angle. In the drawing, FIGS. 1-8 illustrate various aspects and embodiments of PVA.

In general overview, the PVA method aligns two associated coordinate systems using the minimum information required and allowing for imperfection while maximizing precision at a certain location. This represents one alignment event. The coordinate systems are "associated" by virtue of at least one (and typically many) points of association. A point of association has a counterpart or twin point (the "associated point") in a different coordinate system. Some of these points may be feature points as explained above. Some of them may be spatial anchors. In the following discussion, each point of association exists in both a leading space (or leadSpace) and a following space (or followSpace). The spatial locations of a single point of association (a pair) may be specified by its locations (for example using Cartesian coordinates) in the two associated coordinate systems.

For example, one "space" may be a digital mapping of a real physical space generated from sensor data acquired by a device in the space. In other cases, a "space" may refer to a 3D region in a digital model. The model may be a "digital twin" of a corresponding physical space. For illustration, and not to limit the scope of the disclosure, we will define sensor-acquired real physical location data as existing in a lead space, so that the location of a point of association is described in the leadSpace coordinate system. The corresponding (twin) point of association may be specified in the follow space coordinate system. The leadSpace is not limited to a physical space.

The PVA process aligns the two spaces, or more specifically aligns their coordinate systems, by defining how to reposition one of them (the follow space or "followSpace") to align it to the other (the leadSpace), typically in 3D space, although the described process can be applied in a 2D context as well. The repositioning may comprise translation and rotation steps. By aligning the two spaces, they will then have a common origin location, and orientation. This alignment process preferably is implemented in software, for example, as a function or method that can be called by other software. The calling program may submit data such as points of association as inputs, and the PVA process can return data to align the calling process coordinate system to the lead coordinate system.

In an embodiment, a PVA method may comprise the steps of:

provisioning a processor and machine-readable memory operatively coupled to the processor, the memory storing instructions that when executed cause the processor to:

receive an alignment request, the alignment request including first 3D spatial data defined in a leadSpace coordinate system having a leadSpace origin;

identify stored second 3D spatial data that is associated with the first 3D spatial data and is defined in a followSpace coordinate system that is not aligned to the leadSpace and has an origin that is not the same as the leadSpace origin;

based on the first and second 3D spatial data, determine parameters to move and re-orient the followSpace coordinate system to align it to the leadSpace coordinate system; and return a reply to the alignment request that includes the determined parameters.

The second part below describes "RISA"—Resilient Interdependent Spatial Alignment—methods to dynamically re-align or adjust alignment of two related coordinate systems. The RISA processes in a typical application will frequently utilize or call a PVA-type of method to make incremental adjustments to align the two coordinate systems of interest. In the drawing, FIGS. 9-15 illustrate various aspects and embodiments of RISA.

Systems and methods are disclosed to improve resilience and accuracy of alignment of a digital model to the corresponding physical space. The present disclosure in some respects improves on known AR alignment technologies to enhance accuracy, persistence, and adaptation on the fly to changes in the subject physical environment. RISA is shorthand for a novel, automated, dynamic AR alignment process as described herein. Alignment of a 3D model to a corresponding physical site is initially established as described below and thereafter the alignment is continuously adjusted or "fine-tuned" automatically as an AR device moves about in the physical space. This dynamic, ongoing alignment may be accomplished by establishing and updating a dynamic network of subsidiary association points (SAP), also called RISA Points, which in one embodiment are arranged in a regularly-spaced pattern such as a grid pattern. These points use an association method that is automatic and invisible to the user as described in more detail below. The SAPs or RISA Points may be acquired by SLAM or other techniques and stored in a database. Location and identifying data for each point may be uploaded to remote "cloud computing" resources as explained in more detail below.

In an embodiment, at least some of the points of association are networked together so that we can have more convenience, more accuracy, and more resilience. They are not literally "networked" in the communication sense. Rather, relationships among them are established and dynamically updated to optimize alignment accuracy. To that end, the disclosed system in one embodiment creates a dynamic web or mesh of primary (authoritative) and secondary points of association. The authoritative points of association (or "APA") can be implemented using manual visual alignment by user (see "Air Handles" below), fiducials, or any combination of them with other technologies that associate a physical point to a digital point.

Authoritative RISA Points (aka APA) may be declared in various ways. The position relative to the digital twin can be declared by choosing a known location in the digital twin, entering coordinates (relative to the project base point, or standard geospatial coordinates), or by importing survey points from standard surveyor practices. Then that point is placed in physical space by an AR spatial interface or by using any other association tool (such as a fiducial marker, Bluetooth, WiFi, sonic, etc.) in that physical location and associating the fiducial marker with the digital location. Associated authoritative points are used to create modifiers to RISA points as described in more detail below.

In the appended claims, we describe not the core concept but rather, practical applications of the concept that can be implanted in software executable in actual physical systems, for example, utilizing Microsoft's Azure cloud resources, including its Spatial Anchor tools, and physical devices such as a smartphone or AR (or "mixed reality") displays such as the Microsoft HoloLens 2. Apple Computer may be developing holographic projection capability for next-gen iPhones. Apple also has its own AR headsets and glasses under development. When released, such devices may be useful in connection with embodiments of the present invention.

In one example, a computer-implemented initial setup method for a resilient interdependent spatial alignment (RISA) process to improve and maintain spatial alignment between two associated coordinate systems, may include the steps of:

defining a point of focus in a leadSpace;

acquiring from a user device minimum information for a single PVA alignment of the two coordinate systems at the point of focus;

delivering the minimum information in a request to a PVA process;

responsive to the PVA request, receiving a transformation for initial alignment of the two coordinate systems at the point of focus;

sending a request to a RISA process for a new RISASite, the RISA request including parameters to define at least a scale and cell density for the new site;

storing an identifier of the new site for future sessions;

in the RISA process, initializing the new site, and storing the site definition to a datastore;

identifying a first cell in the RISASite that includes the point of focus;

defining a first RISAPoint in the first cell at the point of focus;

storing, in association with the first RISAPoint, a location of the point of focus and the transformation returned by the PVA process so that the RISAPoint links a single point position in the two coordinate systems;

selecting additional cells in the RISASite that are adjacent to the first cell;

creating new anchor points in each of the adjacent cells that have adequate data, each anchor point characterized by a corresponding location and an identifier; and storing the new anchor points in a datastore for subsequent use to improve and maintain alignment between the two associated coordinate systems.

BRIEF DESCRIPTION OF THE DRAWINGS

To describe the way the above recited and other advantages and features of the disclosure can be obtained, a more particular description follows by reference to the specific embodiments thereof which are illustrated in the appended drawings. Understanding that these drawings depict only typical embodiments of the present disclosure and are not therefore to be limiting of its scope, the present disclosure will be described and explained with additional specificity and detail using the accompanying drawings in which.

DESCRIPTION OF PREFERRED EMBODIMENTS

Part I—PVA

We describe a preferred embodiment of a coordinate system alignment process that may be called a Point-Vector-Angle or "PVA" for reasons that will become clear. PVA must be implemented in software as a practical matter due to the complexity, for example, of the vector calculations, and the need for speed. In a preferred embodiment, the process aligns a coordinate system to another coordinate system in a matter of milliseconds. This is particularly advantageous to client (calling) processes that implement changing AR scenes in real time.

More specifically, the disclosed process performs one alignment of a followSpace (an "alignment event") based on a few points of association, or a vector and at least one point of association. Many practical applications, including the RISA process described below, that use this process may need to request a new alignment on the order of several times per second. For example, in an augmented reality application, a capture device may be moving in a space, collecting, and processing 3D data in real time. As the device moves, new points of association come into view, and a new alignment may be called. Frequent updates are essential for good accuracy. More specifically, the spatial location becomes more accurate, generally, as the image capture device is brought closer to an association point. Based on that new location, a new alignment will bring the follow-Space into alignment with the corresponding physical space. PVA alignment can be applied in both a vertical setting and a more open-ended 3-dimensional setting. The process accepts points or sensor data.

Figure 1:
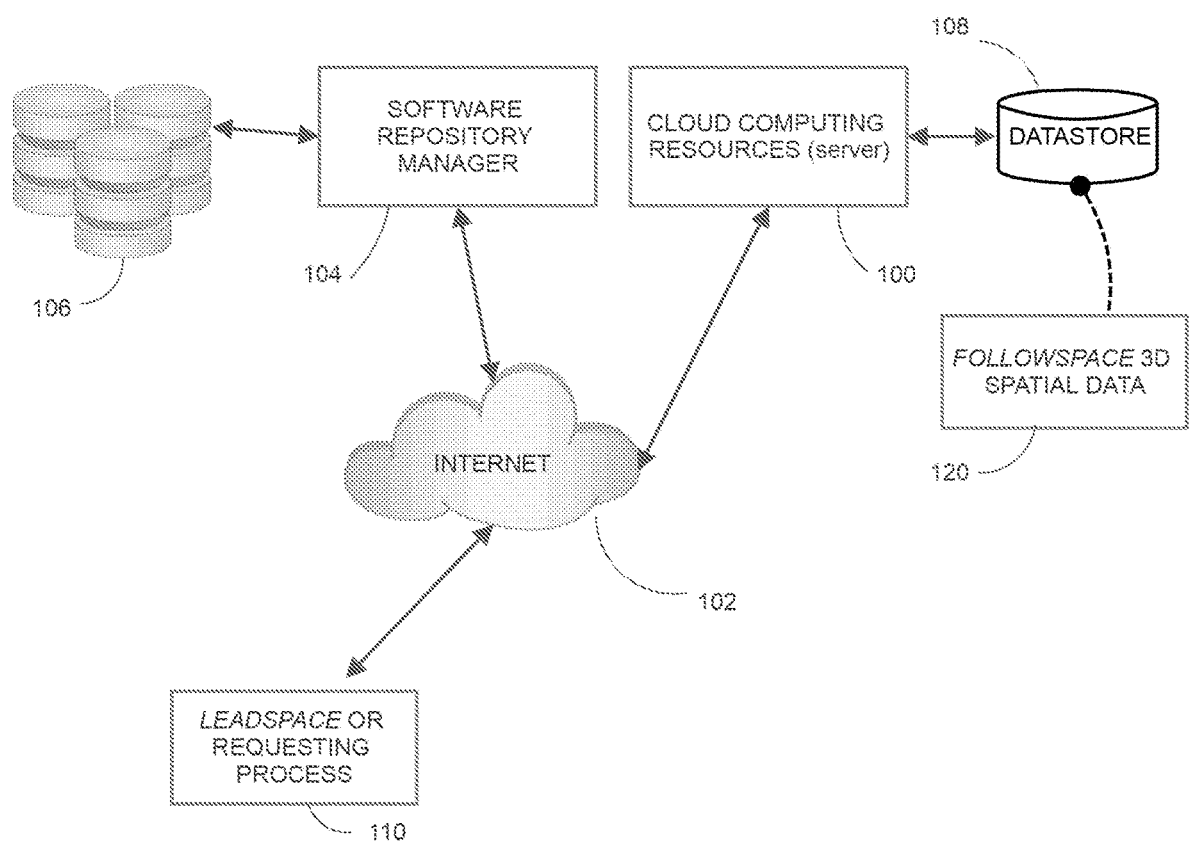
FIG. 1 is a simplified conceptual diagram of a cloud-based system to support AR.

FIG. 1 is a simplified conceptual diagram of a cloud-based system to support AR. Cloud computing resources, including servers 100 and associated data storage 108, are coupled for communications over a network, for example, the internet 102. They could operate over a local network as well. A 3D digital spatial model 120 may be stored in the datastore 108 and thus accessible to the server(s). A software repository manager 104 may be provided to manage software maintained in storage 106. The available software for execution in the server(s) includes relevant AR tools and resources, for example, those provided by Microsoft, Unity, Google, and others. A 3D spatial capture device 110, which may be mobile, is able to communicate with the server via the network connection(s). The present invention has many applications, one of them being to assist an AR application, which may be executable in a capture device 110 which also includes a display. For example, the capture/display device may call an alignment process or method as described herein to align a digital model (say 120) to a physical scene in view of the capture device. Aspects of the aligned model may be displayed for example, as a hologram.

The three main steps of PVA can be summarized as Point (actually association point translation), Vector (a rotation of the followSpace based on vector manipulations), and Angle (the final rotational movement of the followSpace); hence the name PVA. One embodiment proceeds generally as described below. The order of execution of steps described below is not critical, as it might be say, in a chemical process, but in many cases, the information for later steps requires that the earlier steps be completed in order to pass the correct information to the later steps. So, one step could "stall" on occasion if the required information is not yet necessary. On the other hand, adequate hardware and or software techniques such as parallel processing or multi-threading can be brought to bear to avoid such situations.

Step 1 POINT (Translation)

This process conducts a translation of the follow coordinate system to move a selected pair of two associated coordinates into alignment. This may be called the translation point. That is, "the point" is singular, but initially its counterpart (associated) points in the two coordinate systems are offset. It is intended to be the point with the best information, closest to the areas of interest because precision is most important in translation.

In an embodiment, a PVA application identifies position coordinates of a selected point—a point of association—in both lead and follow coordinate systems. This may be called the translation point. Then, in three-dimensional vector space, without rotation, the process moves or translates the followSpace by vector subtraction. Again, the translation will be applied to the followSpace coordinate system, not just to a single point. Of course, moving the coordinate system effectively moves that point of association and all others in the followSpace.

The translation may be determined by the formula: followPosition=followPosition+(followPoint−leadPoint). In other words, the location (position) of the point of interest is moved by the offset or "delta" (followPoint−leadPoint). More specifically:
i. A'=A+(B−C)
ii. A'=followSpace target position
iii. A=followSpace original position
iv. B=the expected position in follow coordinate space that is associated with a coordinate point in leadSpace ("followPoint").
v. C=the equivalent position of that point in leadSpace ("leadPoint").

Put another way, for example in C# code, the position translation may be expressed as follows:

```
var deltaPostion=transPointLead.position−transPoint-
    Follow.position;

var positionStart=followSystem.position;

var positionFinish=positionStart+deltaPostion;

followSystem.position=positionFinish
```

Figure 2:
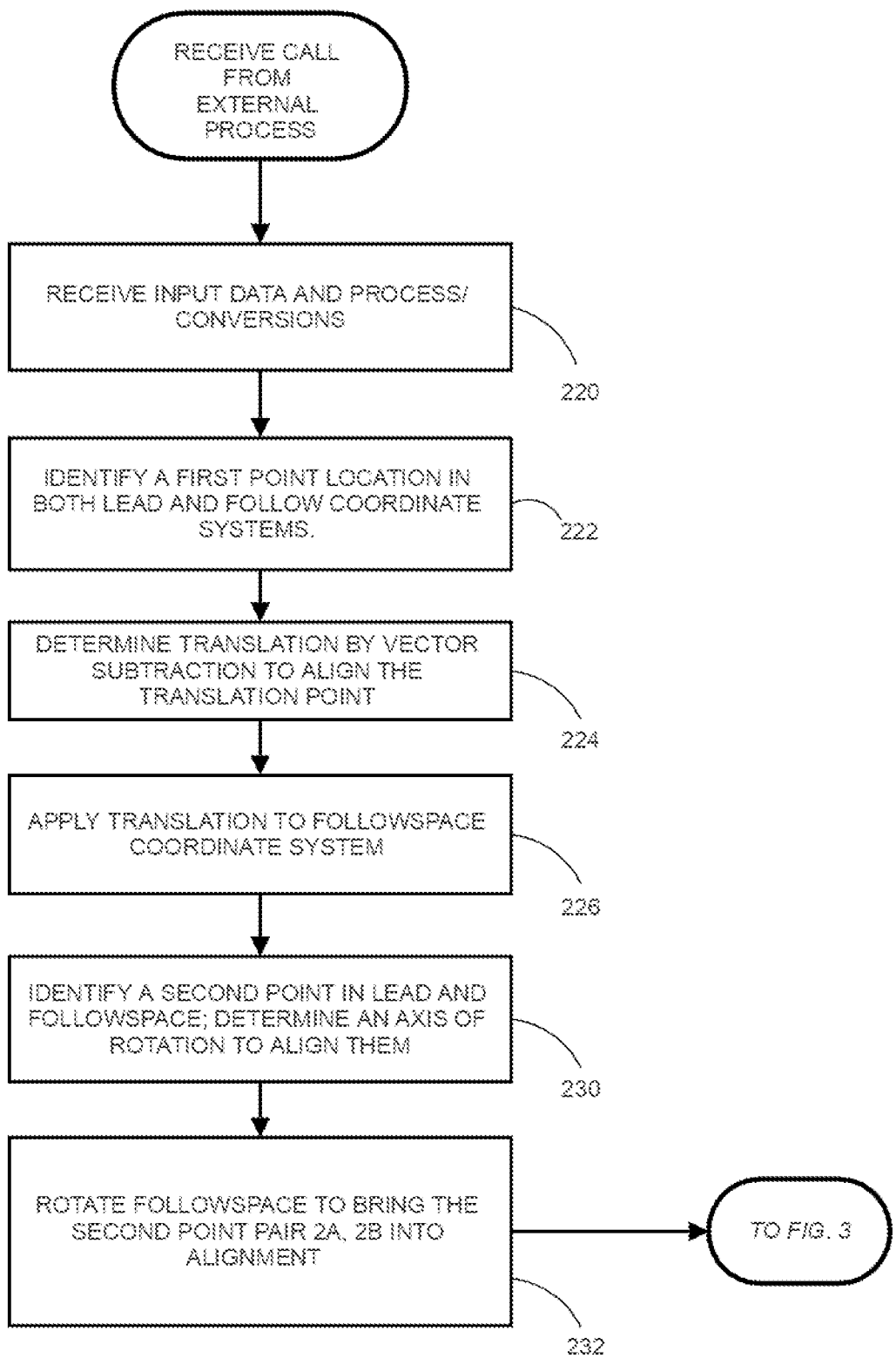
FIG. 2 is a simplified high-level flow diagram illustrating software operations to realize translation and vector rotation steps of a (PVA) alignment process in accordance with the pre sent disclosure.

FIG. 2 is a simplified high-level flow diagram illustrating software operations to realize translation and vector rotation steps of a (PVA) alignment process in accordance with the present disclosure. This software process may be called or invoked by an external process or program such as the RISA process described below (see FIG. 15 and associated text.) It receives input data from the calling program, which may be part of an alignment request message or call. The PVA may convert the input data as needed, block 220. In more detail, input data may comprise various types. In one example, all of the elements needed for alignment are provided by points of association. In another case, a vector may be provided by sensor, and an angle of rotation about that vector is provided by one or more additional points. That provided vector corresponds to the vector determined in Step 2 below. In another example, both vector and angle of rotation may be provided by sensor.

For illustration, we describe the first case where the input data comprises associated points or pairs. The process selects or identifies a first point (or location) for translation—the translation point, block 222. The translation point and its associated counterpart each has a location in the leadSpace and in the follow space, respectively. The translation point may be selected automatically or by manual input. This single point can include 2D marker (computer vision), spatial anchor, beacon trilateration, etc. The goal is to align the two coordinate systems using the minimum information required and allowing for imperfection while maximizing the precision at the translation point.

The process identifies the locations of the translation point in each of the coordinate systems—the leadSpace and the followSpace. (We often use "space" as a shorthand for a coordinate system used to describe locations in a given physical space, digital model, or other spatial information environment.) Here, we call them the "lead" and the "follow" coordinate systems because the follow space will be moved into alignment with the leadSpace as explained below.

Next, the process determines a translation vector in 3D space to align the translation points, block 224. Here, we refer to plural "translation points" to mean the associated pair of points in leadSpace and followSpace. After they are aligned to the same location, that location may be called the "translation point" using the singular. The translation vector may be determined by vector subtraction. Then, the process translates the follow space, without rotation, according to the translation vector, block 226. In more detail, we can define followPosition=followPosition+(followPoint−leadPoint) where:

$$A'=A+(B-C)$$

A'=followSpace target position
A=followSpace original position
B=the expected position in follow coordinate space that is associated with a coordinate point in leadSpace.
C=the equivalent position of that point B in leadSpace.

The translation is applied to move the followSpace according to the determined vector, so that the translation point is now aligned, i.e., in the same location in both spaces. This completes Step 1—Point (Translation). The steps summarized in remaining blocks 230-232 of FIG. 2 are described below.

Figure 4:
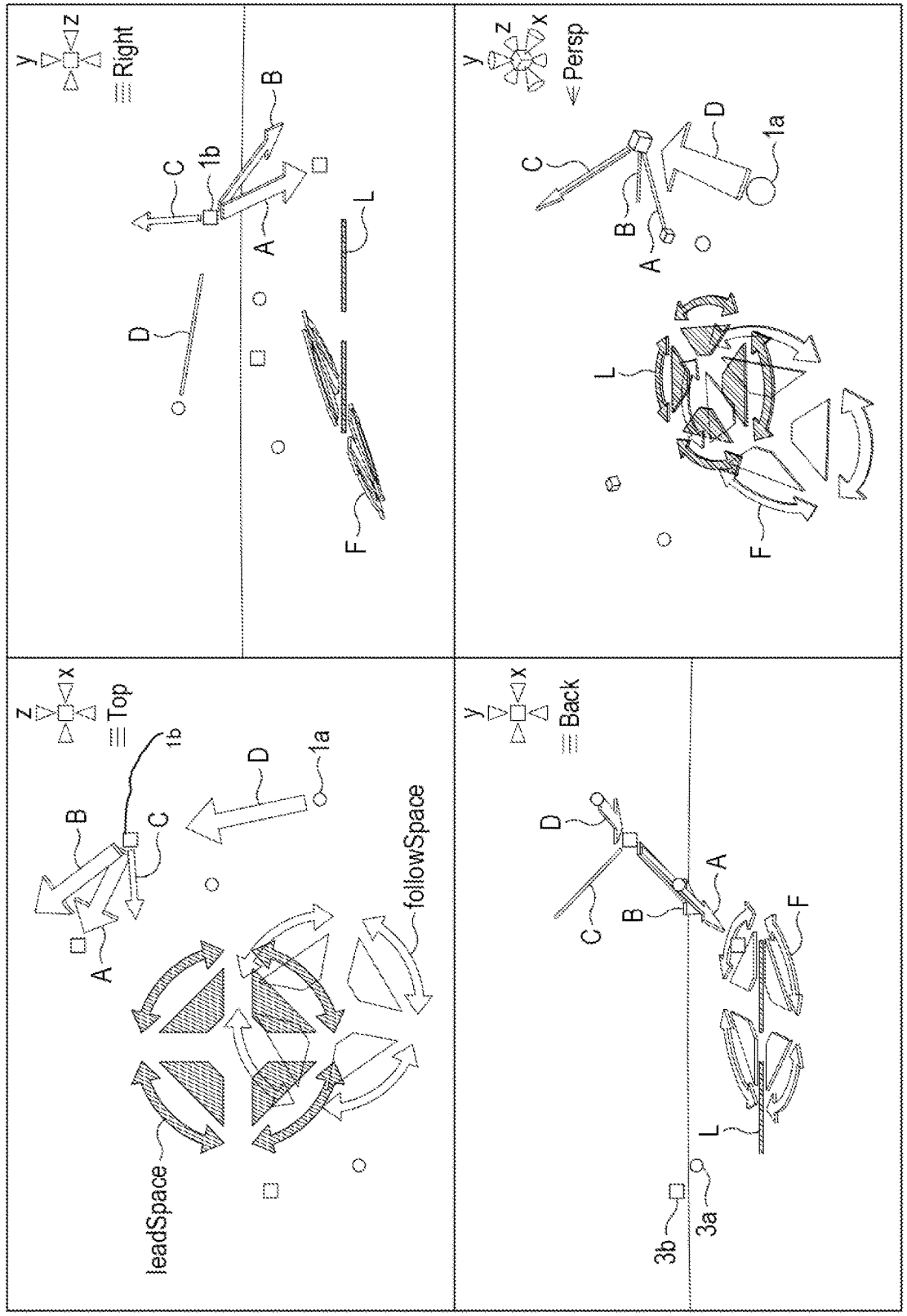
FIG. 4 is a conceptual illustration of three points of association shown in two non-aligned 3D coordinate systems. The quadrants of the figure illustrate the subject in top, right, back and perspective views.

FIG. 4 is a conceptual illustration of three points of association shown in two non-aligned 3D coordinate systems. The quadrants of the figure illustrate the subject in top, right, back and perspective views. In FIG. 4, in the top view, a leadSpace coordinate system is represented as a hatched, generally circular symbol having four symmetrical quadrants arranged around an origin, each quadrant having a double-headed arrow, so that the four arrows represent rotation of the space around its origin in a plane defined by x,z axes. For illustration, the 3D space symbols are shown as having a small thickness. The followSpace is shown in outline, i.e., without shading or hatching, in the various views, using the same symbology as the leadSpace.

Referring again to FIG. 4, in the top view, a first point or point location 1*a* of the followSpace (F) is associated with corresponding point 1*b* of the leadSpace (L). This may be the translation point. A translation vector D is determined as described above to align these two points by moving (translating) the followSpace in 3D without rotation. The other quadrants of FIG. 4 show the translation vector D in the right, back and perspective views. In this figure, vector D does not extend completely to the associated point 1*b*, but in practice it would. This shows the correct direction of the vector.

Figure 5:
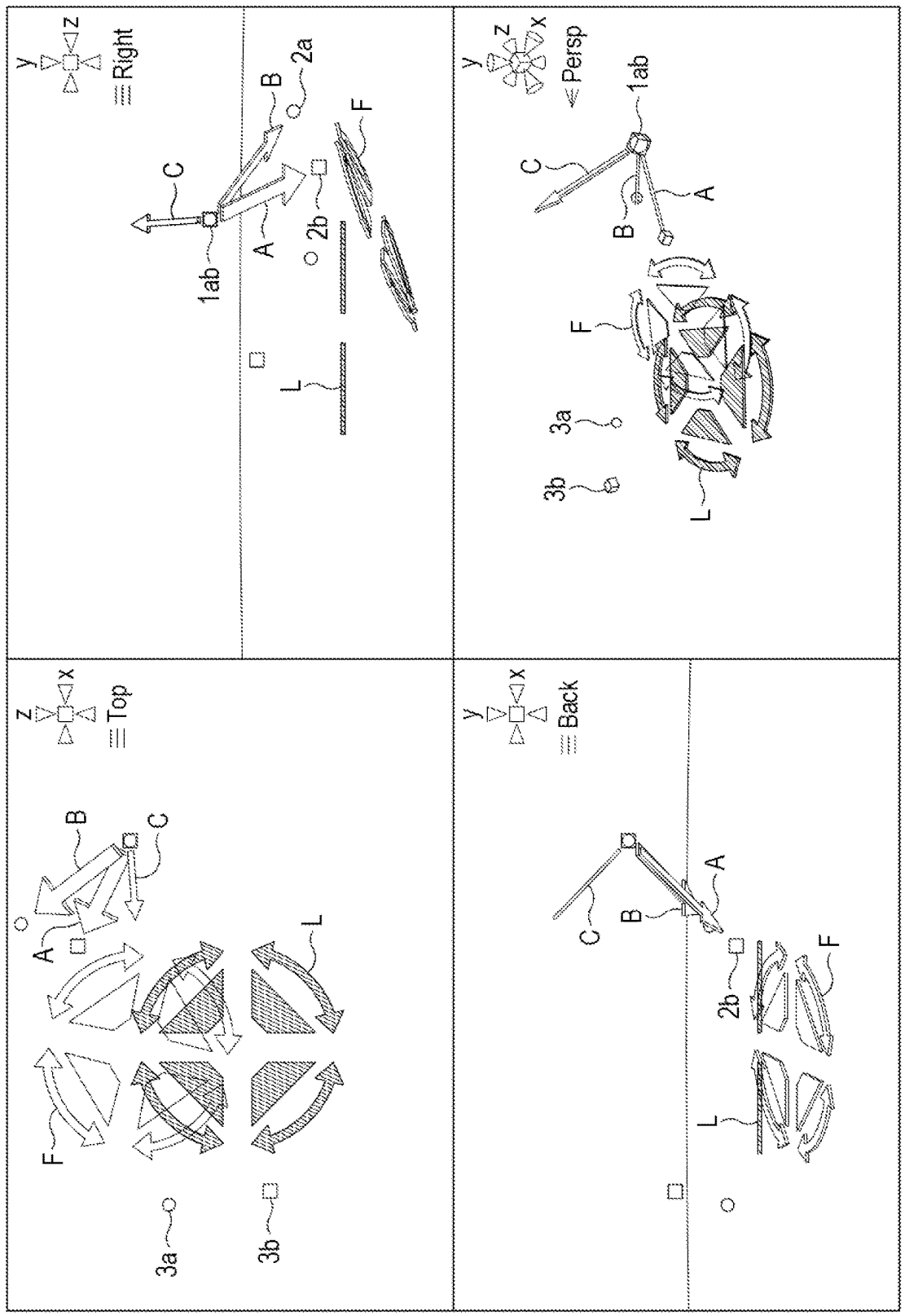
FIG. 5 is a conceptual illustration of the two coordinate systems and associated points of FIG. 4 after a translation process.

FIG. 5 is a conceptual illustration of the two coordinate systems (L) and (F) and associated points of FIG. 4, again in four views, after the initial translation according to vector D. The reference "lab" is used to show that associated points 1*a* and 1*b* are now in the same location. Put another way, the two coordinate systems are now aligned at least at that one point. The top view shows how they are considerably offset in the x,z plane. And the back and right views clearly show how the two coordinate systems are oriented very differently. A Z-axis vector located at the newly-aligned point lab will be used for the next step rotation.

Step 2 Vector Rotation

Next the followSpace is rotated about two axes or in two degrees of freedom. In an embodiment, this may be done as follows. Rotation is taken at the point of translation such that it stays in place and the followSpace rotates around it. Referring now to FIG. 5, the translation point, now labeled lab has been aligned. A second point or pair is labeled 2*a* for the followSpace location, and 2*b* for the corresponding leadSpace location. A first vector B (follow vector) shows the direction from the translation point (lab) to point 2*a*. Another vector A (lead vector) shows the direction from the translation point (lab) to point 2*b*. These two vectors AB define a plane, and we are going to rotate the followSpace coordinate system to bring them into alignment in that plane.

Figure 6:
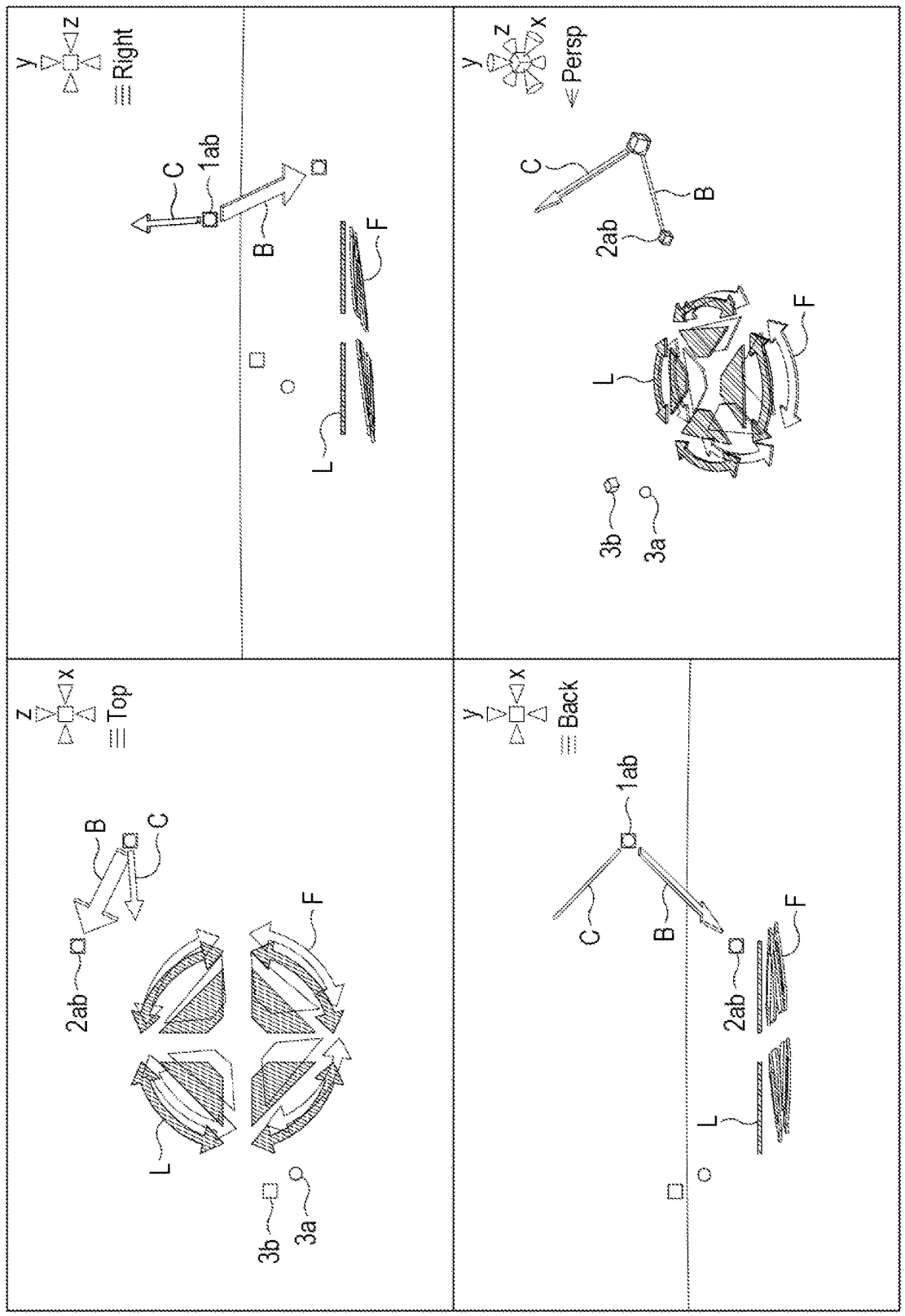
FIG. 6 is a conceptual illustration of the two coordinate systems and associated points of FIG. 5 after a vector rotation process.

To do so, we determine an axis that is normal to both vectors, i.e., it is normal to the plane in which both points are located. In FIG. 2, see block 230. This axis of rotation may be determined by taking a cross product of the vectors A and B. This new axis of rotation is illustrated by vector C. The process then rotates the followSpace about this new axis of rotation so as to move point 2*a* into alignment with point 2*b*. See FIG. 2, block 232. Referring now to FIG. 6, the results of the rotation are shown, wherein 2*a* and 2*b* are now aligned to form point 2*ab*. At this point, the normalized z axis vectors are aligned but additional information is needed to apply the final rotation.

FIG. 6 is a conceptual illustration of the two coordinate systems of FIG. 5 after the vector rotation process described. In FIG. 6, points 2*a* and 2*b* are now aligned at the same location, labeled 2*ab*, as a result of rotation of the followSpace. This rotation is effectively in two dimensions, due to the selected axis of rotation, which is not along the followSpace Z axis.

Scaling

The two coordinate systems may not have the same scale. Optionally the alignment process may scale the follow coordinate system by the magnitude ratios between the two coordinate systems. Scaling is practicable when vectors include magnitude, such as when driven by points in the above example.

i. Ratio=Magnitude of the lead vector/magnitude of the follow vector. This refers to the vectors A and B, respectively, described above.
ii. Scale uniformly in all 3 dimensions by the ratio value, with translation point as fixed point of scaling.

At the end of step two, the direction of the vectors are in precise alignment. If scaling is applied or is not needed, then the points driving the vectors are also precisely aligned.

Step 3—Angle

Figure 7:
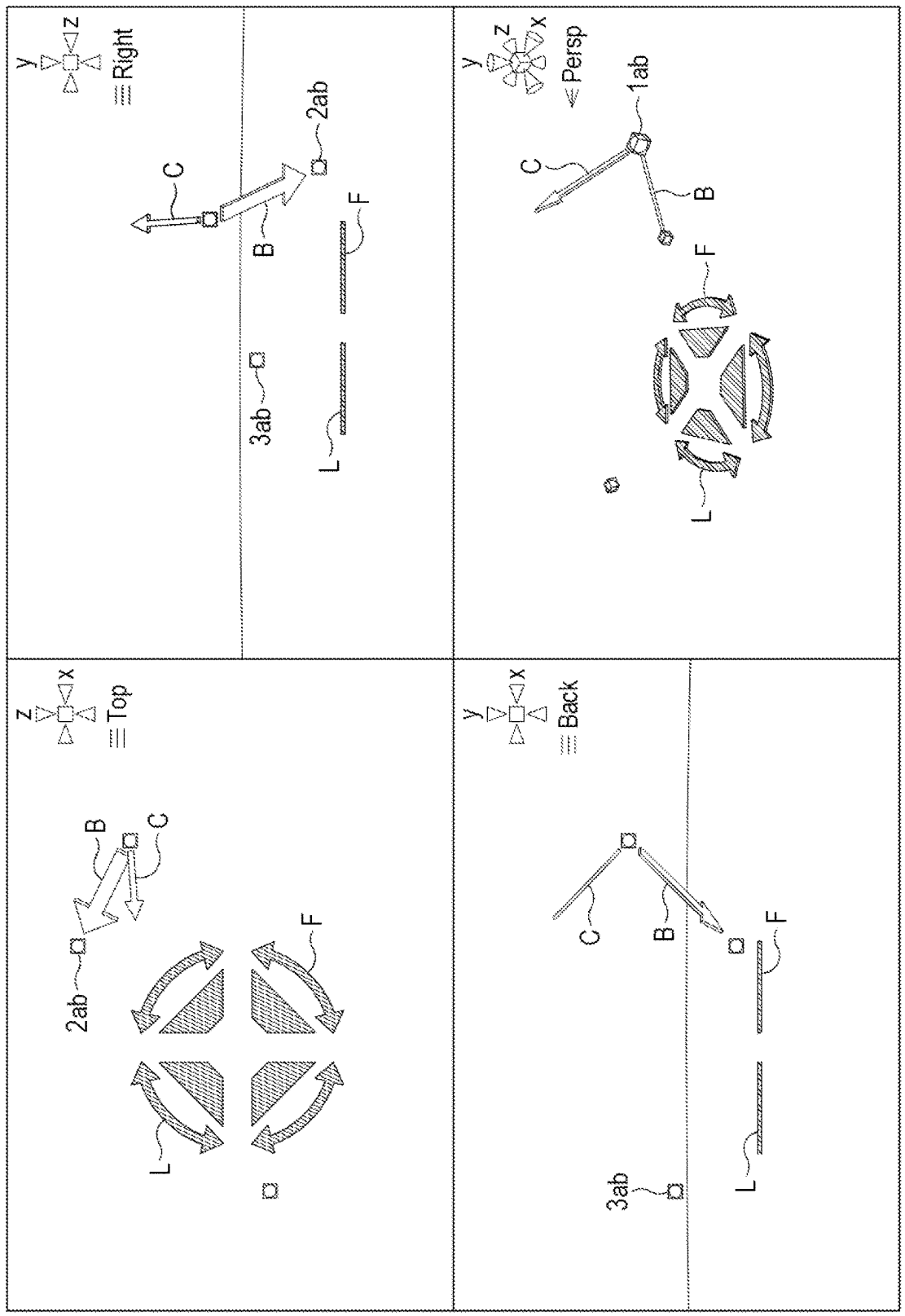
FIG. 7 is a conceptual illustration of the two coordinate systems and associated points of FIG. 6 after a final rotation process brings the two coordinate systems into alignment.
Figure 8A:
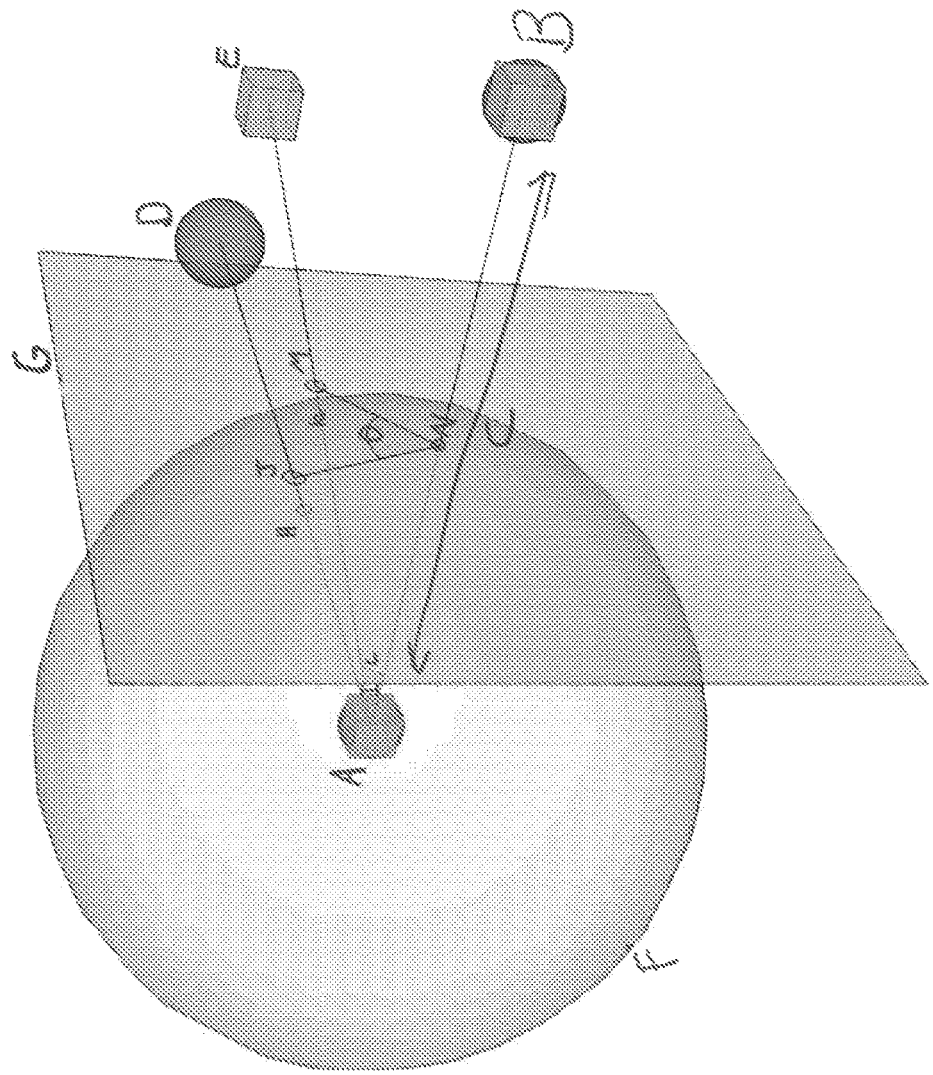
FIGS. 8A, 8B, 8C and 8D show a conceptual diagram in various views to illustrate a process to determine an offset angle in 3D space between a point location and its counterpart location in two different coordinate systems.
Figure 8B:
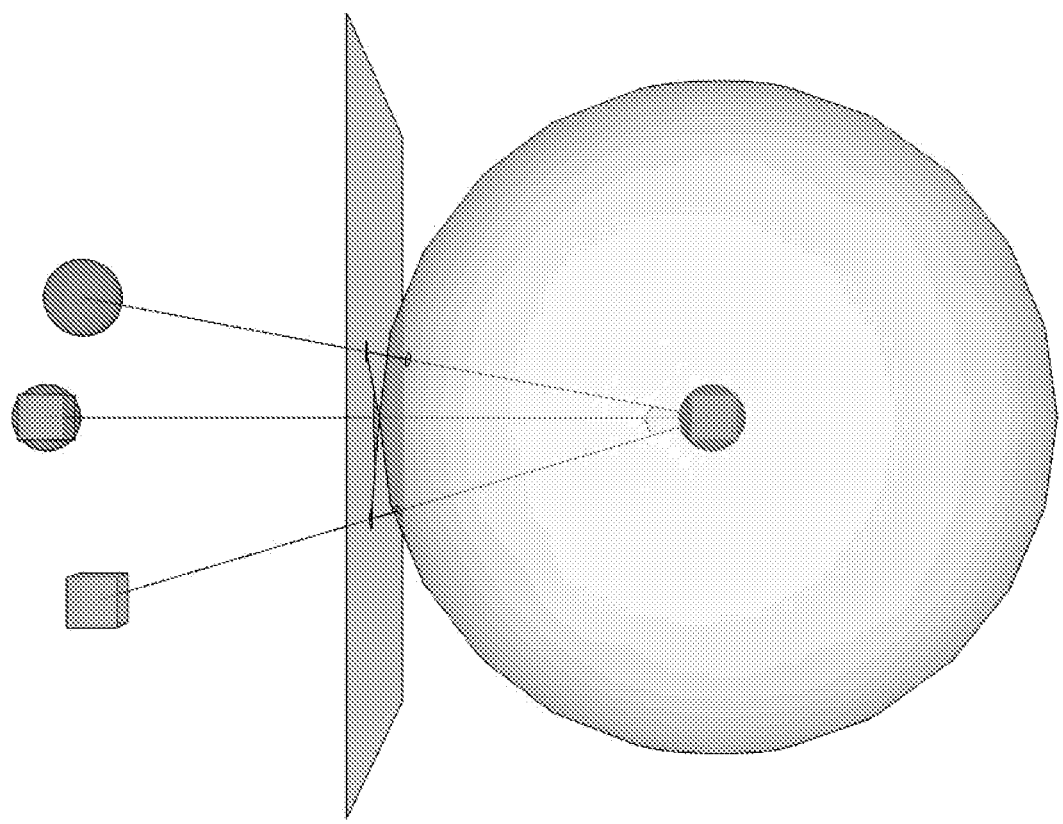
Figure 8C:
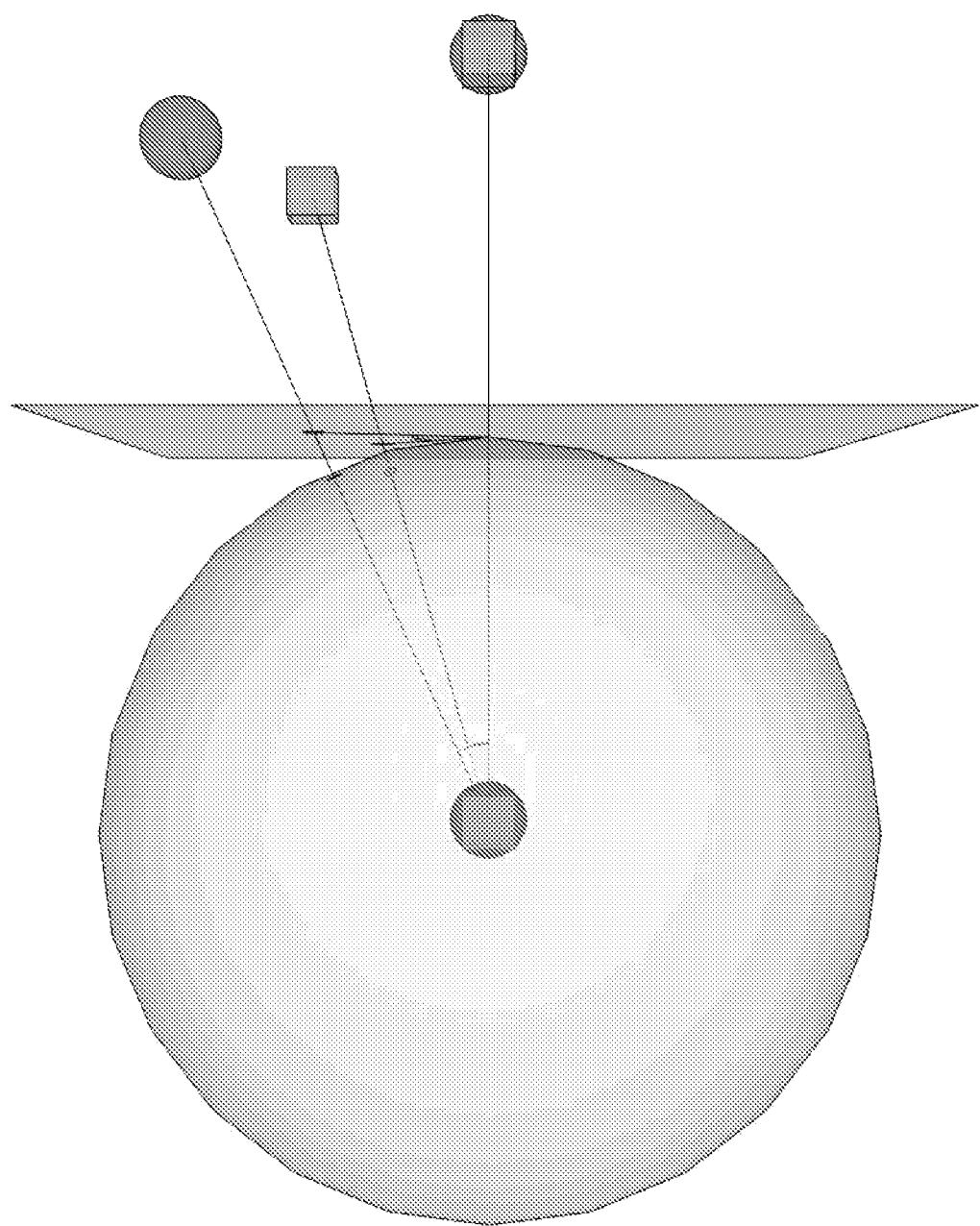
Figure 8D:
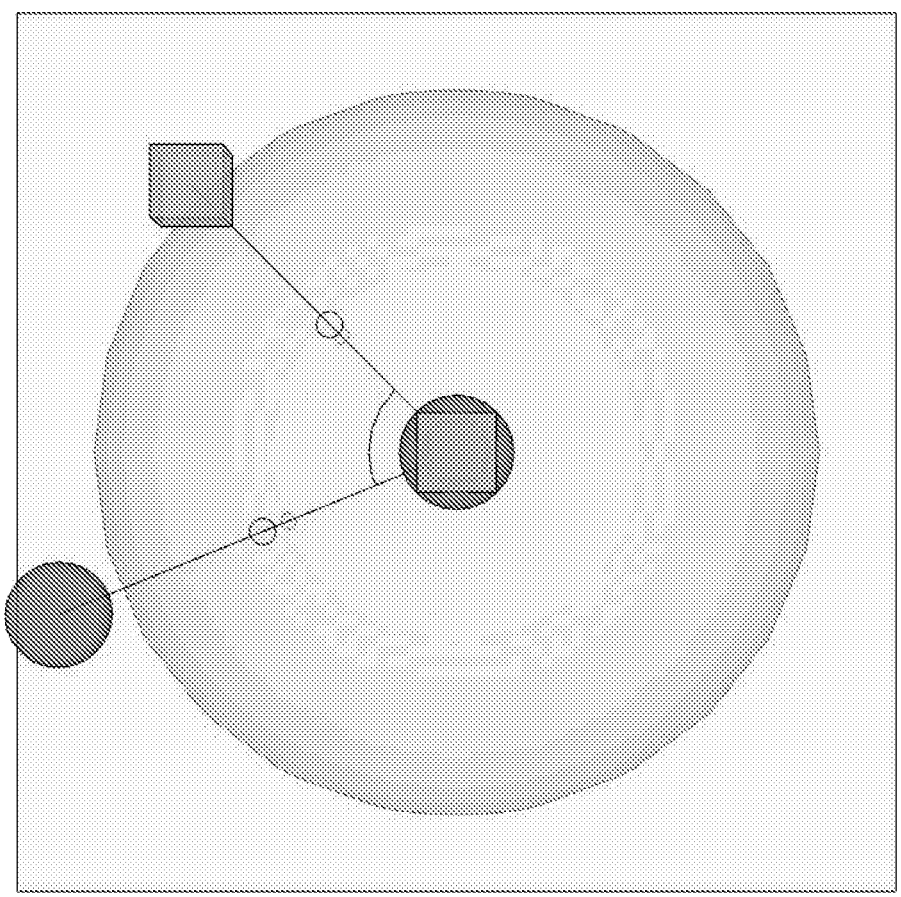

The last step is to rotate the followSpace about an axis defined by the newly aligned vectors from the previous step. That is, we will rotate around an axis defined by a vector direction from points lab to tab. This is the third and final degree of freedom. We call this the second axis of rotation. To conduct the final adjustment, a new point is selected, for example, a third associated pair (illustrated as points 3*a*, 3*b* in FIG. 6). The final rotation is designed to bring those points into alignment, and thus complete alignment of the two coordinate systems. The new point must not have a location along the z axis in both lead and follow coordinate systems. That is because there would be no angle between them. Similar to the rotations that took place in the vector step, the followSpace coordinates are rotated about the second axis of rotation to set that angle to zero. FIG. 7 is a conceptual illustration of the two coordinate systems of FIG. 6 after a final rotation process brings the two coordinate systems into alignment. The third and final point 3*ab* is now aligned, as are the first two points, and the two coordinate systems overall.

Figure 3:
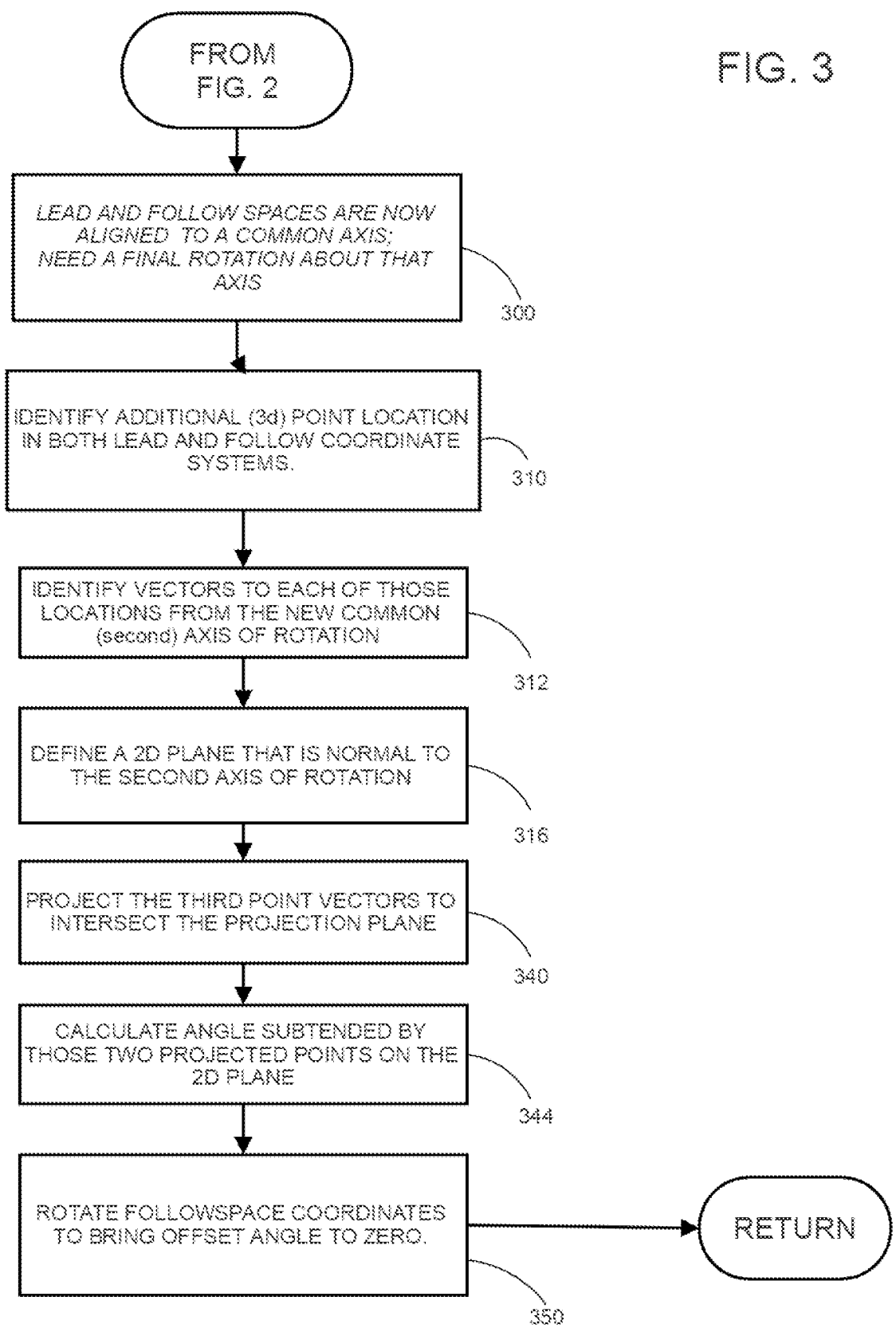
FIG. 3 is a simplified high-level flow diagram illustrating software operations executing a final rotation step of the alignment process.

FIG. 3 is a simplified high-level flow diagram summarizing software operations executing this final rotation step of the alignment process. As noted, the two spaces are now aligned with respect to a common Z-axis, informational block 300. We identified an additional point (the new point) location in both coordinate systems, block 310. Unit vectors are formed to each of those locations from the new common z-axis, block 312. The process next defines a plane in the 3D space, a "projection plane" such that projections of the third point unit vectors intersect the projection plane, block 316. Next step is to project those unit vectors to intersect the projection plane, block 340. Then, calculate an angle subtended by those two projected points, based on the distance between them in the projection plane, block 344. Finally, we rotate the followSpace about that z axis by the calculated angle so as to bring it to zero, block 350; that is, align the two coordinate systems. The process then returns its results.

In some cases, the alignment request may include a vector and angle for rotation is provided by one or more additional points. For example, a vector, say a down (based on gravity) direction, may be provided by a sensor. The alignment process described above may be modified accordingly. As before, an observed or leadSpace point is used to drive translation. The provided vector (for example, down vector) serves as an axis of rotation, and the amount of rotation is determined based on one or more point locations in leadSpace and their associated locations in the followSpace.

FIGS. 8A, 8B, 8C and 8D show a conceptual diagram in various views to illustrate in more detail a process to determine an offset angle in 3D space between a point location and its counterpart location in two different coordinate systems. In particular, these illustrate in more detail the projection of the third point vectors into the "projection plane" labeled "G" in FIG. 8A. The following features also are labeled:
A. Aligned translation points (from step 1)
B. Aligned vector direction points (from step 2)(note: direction is perfectly aligned, points may not be, unless scale step is used, in which case alignment is precise.)
C. Axis of rotation for step 3, made out of aligned direction vectors from step 2.
D. Follow point for step 3 angle
E. Lead point for step 3 angle
F. Unit vector sphere
G. Plane perpendicular to axis of rotation, intersecting unit sphere
H. Position at unit vector of point D
I. Angle between axis of rotation and vector to point D, used to find projection length.
J. Position of AD vector projected onto plane. Used for final angle calculation.
K. Position at unit vector of point E.
L. Angle between axis of rotation and vector to point d, used to find projection length.
M. Position of AE vector projected onto plane. Used for final angle calculation.
N. Position at unit vector of AB
O. Angle JNM. Final angle to rotate about axis C.

Part II. RISA

Briefly, the present process will receive data about a model, and various authoritative association points. RISA will make calls to a PVA alignment method or process and known point association methods, and will continuously maintain alignment of two coordinate systems (one follow coordinate system moving to align to one lead coordinate system). In an AR setting, for example, the two coordinate systems being aligned are holograms and physical space. In others it's spatial data and physical space, or even spatial data 1 and spatial data 2. In AR, the physical world is always the leader because it cannot be relocated to match the digital model.

Figure 9:
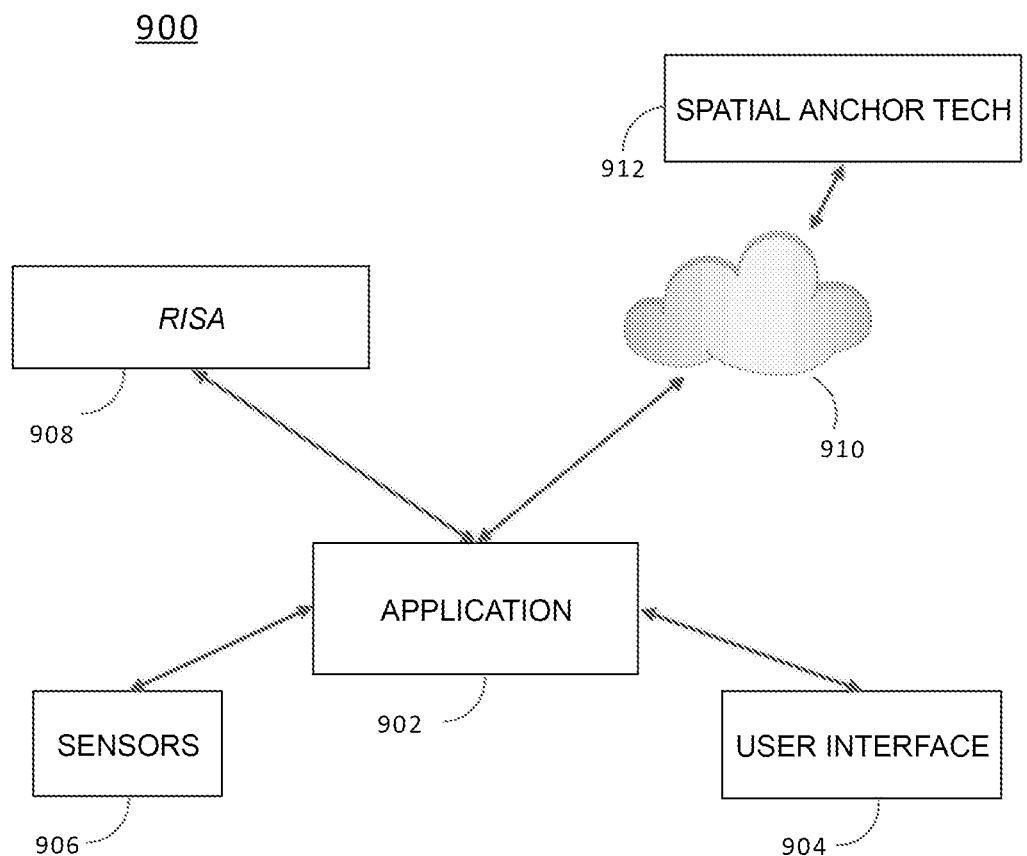
FIG. 9 is a high-level conceptual diagram of a system to utilize resilient interdependent spatial alignment to improve and maintain spatial alignment between two coordinate systems.

FIG. 9 is a high-level conceptual diagram 900 of an example system to utilize resilient interdependent spatial alignment to improve and maintain spatial alignment between two coordinate systems. In the figure, a system may comprise an application program 902, which may be deployed, for example, on a mobile or portable computing device. The application is described in more detail below. The application is coupled to a user interface 904, which may include, for example, manual input devices such as a mouse or touchscreen, voice input microphone, tactile glove—motion sensors, or any other input device or means. The user interface also includes one or more display screens, which may be wearable. The display may be part of a tethered or untethered "xR" (augmented reality, mixed reality, etc.) device to enable view of an area along with a superimposed holographic display. In an embodiment, the application is also coupled to sensors 906 which may include one or more cameras, accelerometers, odometrical devices, GPS receiver, etc. User input may comprise interaction with the display, the holographic display, and the camera for example through manual gestures.

Referring again to FIG. 9, the application 902 also is coupled to (or may include) a RISA component or process 908 which it utilizes as detailed below. The RISA component manages data to implement RISA SITES—work areas or volumes of interest, and RISA points—which are points or locations of association for aligning two associated coordinate systems. Finally, the application is configured to utilize data communications over a network 910 such as the internet, at least intermittently, with a spatial anchor technology service, typically provisioned "in the cloud." Several such services are known and commercially available to create and store location "anchors" and provide recognition or "matching" services responsive to spatial input data such as camera frames. In some embodiments, anchor services 912 are used to create and store anchors as requested by the application (or by the RISA component). In other embodiments, anchors may be created (and searched) by the application 902 or by RISA itself without using external services.

The RISA process is resilient in at least two ways: First, it works in a context of inherent imprecision and inaccuracy. When large spatial datasets or spatial maps are imperfect, precise or perfect alignment can't be assumed. This uncertainty is accommodated within a session by (at any given moment) prioritizing alignment of a single point within the larger system and using the rest of the alignment as context. In other words, for alignment between imperfect spatial datasets, or an imperfect dataset and its idealized 'perfect' twin, the whole model cannot be simultaneously in alignment. RISA prioritizes the best alignment precision at a selected point of focus. In an AR use case, for example, this may be the user's device.

Figure 12:
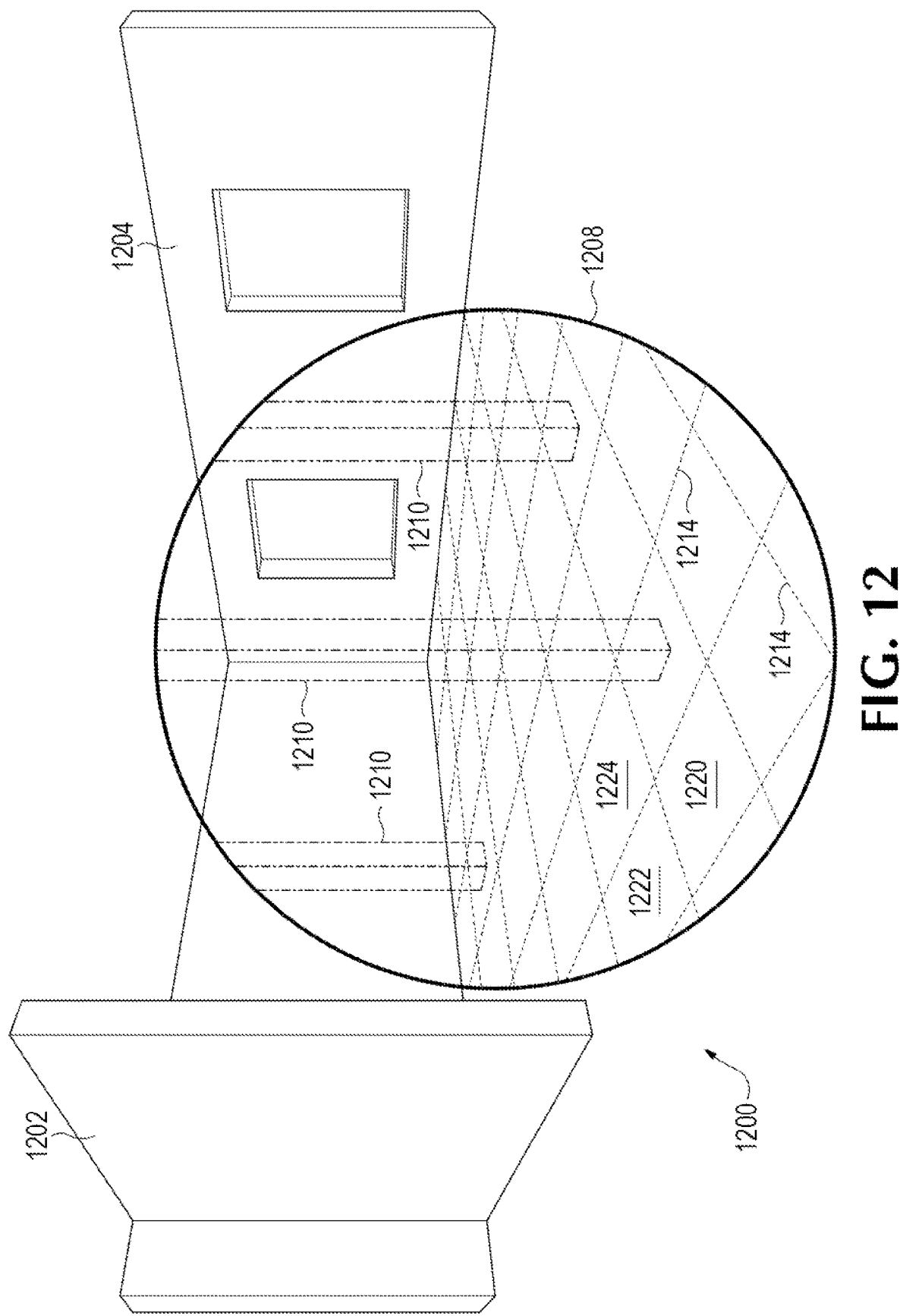
FIG. 12 a simplified conceptual diagram of an AR display of a physical space with a superimposed circular aperture in which the actual view is augmented with AR data.
Figure 13:
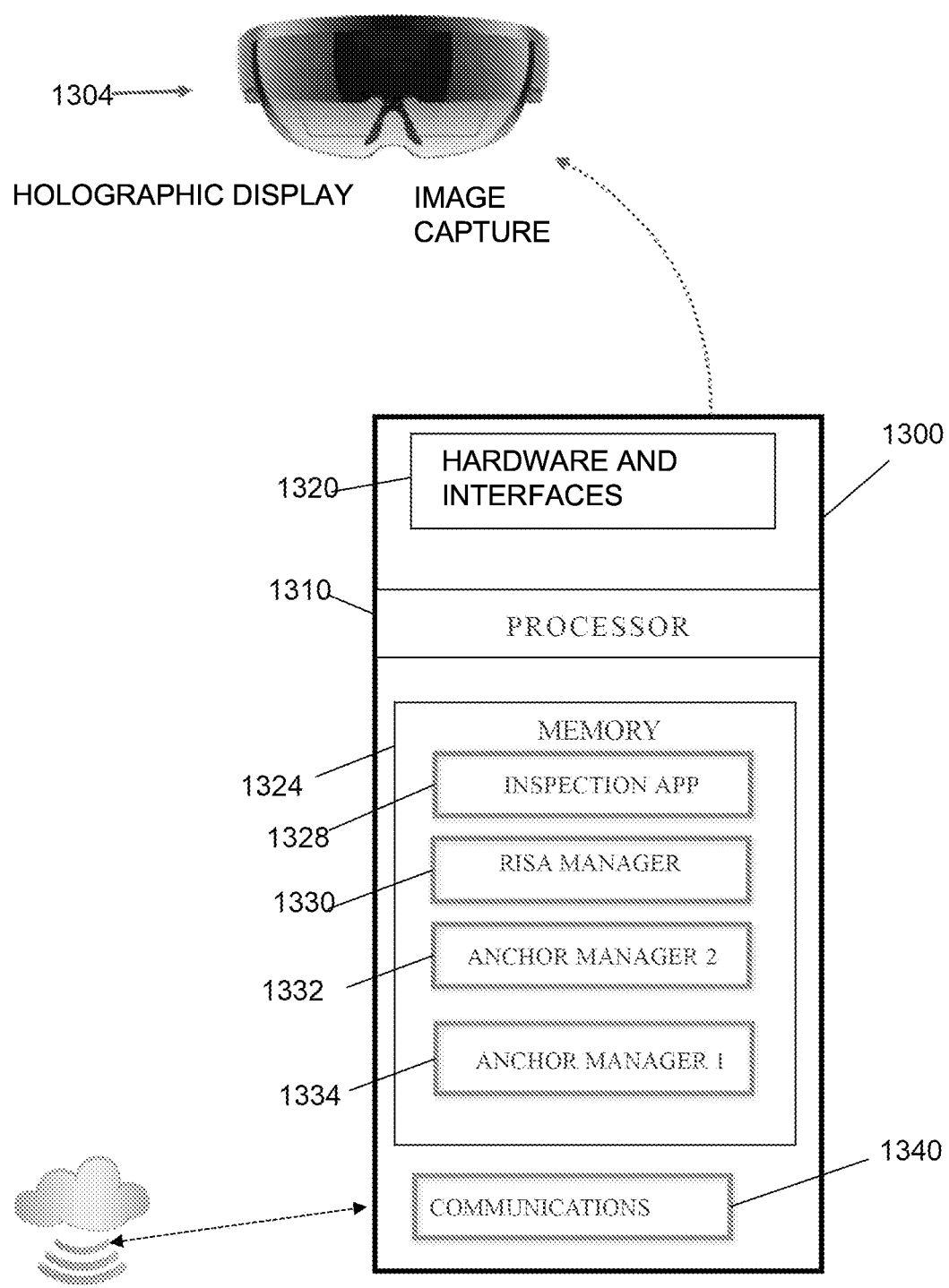
FIG. 13 is a simplified block diagram of a portable AR device and selected software components arranged according to one embodiment of the present disclosure.

In some use cases, a user device may host an application like app 902 and the user device may include or couple to user interface and sensor elements such as those described. One example user device is illustrated in FIG. 13. In some use cases, a user device may be deployed (hand carried, robot mounted, etc.) in a space in a building. To illustrate, FIG. 12 is a simplified conceptual diagram of a physical space 1200 shown in perspective view, with a superimposed circular aperture 1208 in which the actual view is augmented with AR data. The physical space includes actual perimeter walls 1202, 1204. The space is within a field of view of a suitable AR device (not shown). The AR device includes a display for viewing the scene, in which AR data is added, for example, using holographic means, indicated by the aperture 1208. Thus, a user of the device can see within aperture 1208, in addition to the actual physical scene, information added to the display by a processor of the device. The display generally is not static, however. As the user moves about, and the scene changes, so too does the augmented information in aperture 1208 change as it "tracks" the device movements, and RISA technology continuously updates the holographic display to bring it into accurate alignment with the physical scene, based recognizing and processing alignment points as described below. The AR information, shown in dashed lines, (here a planar grid at floor level and columns or posts 1210) is part of a digital model associated with the physical space. Preferably, the holographic display of the AR information may employ color to advantage.

In FIG. 12, the AR data displays vertical posts 1210. For example, the posts may be part of the digital model of the space, but they have not yet been physically installed. The model may comprise detailed plans, for example using BIM, for new construction or remodeling a space. In this figure, dashed lines 1214 form a rectilinear grid. The grid is not limited to square cells; any regularly spaced units may be used. The grid defines a plurality of cells, for example, cells 1220, 1222 and 1224, which we call RISACells. Each cell will contain at least one alignment point or RISAPoint. The grid is not part of the physical space, and in general will not be part of the model either. The grid is conceptual or imaginary, and it may be displayed (or not) by the device software in use. The conceptual grid is utilized as described herein to provide markedly improved persistence and accuracy of alignment of the digital model to the physical space. The grid, i.e., a corresponding set of RISACells and their respective RISAPoints, may be realized by data stored in memory as further described below.

The grid size and dimensions are not critical and preferably they are adjustable by a user. They may vary for different use cases. In one embodiment, a user may "turn a dial" to increase the density of grid cells or RISAPoints, or decrease it because the higher density it is, the more that is a burden on the processing. But the lower density it is, the harder it is to have enough points for precise alignment and overcoming drift. As one example, we have found that 40 points each on the order of 200 feet square for each building space or floor (40,000 square feet) is a good solution.

A second aspect of resilience is the RISA process is resilient to damage. This feature may be called self-healing. Since the alignment point information used is distributed and redundant, successful areas can be used to repair and update broken pieces. Briefly, the data is distributed in that each point has information about itself and surrounding (neighboring) cells and points. More specifically, defective or relatively poor points of association are replaced by better ones during the course of a session. For example, a defective would occur if the environment has changed so the stored data is no longer valid. A poor point would generally come from either low data (not much visual features) or poor data gathering conditions (distance from camera, bad lighting, etc.)

Association Points

Alignment of the two associated coordinate systems generally relies on "points of association"—the corresponding location pairs described above with regard to PVA. There are two main types; the first is authoritative association points. These are points explicitly designated by the application or user to set and adjust alignment. This is the explicit method of input. It can be achieved with manual user input or some other association technology. One method to input an authoritative association point may involve an "air handle"—utilizing an interactive, for example, holographic display system for a user to link a point in the physical space to one in a digital model. The user can "grab" a point in a hologram, move it to the corresponding location in the physical world in view, and lock it down to establish that point as authoritative. In other examples, one or more fiducials, for example, QR codes posted on a wall, or visual "targets" physically placed by a surveyor, may be input to provide authoritative points of alignment for a given space.

A data store of fiducials for a given space can be imported to the RISA system. Authoritative points can be semi-permanent and repeatedly applied, for example, cameras seeing visual markers. Or they can be ephemeral by user input.

Subordinate RISAPoints (or simply, RISAPoints) are the second type of association points. The primary information held by a RISAPoint is a precise location relative to the follow coordinate system, along with the means to find that point in the lead coordinate system. In this way, a RISApoint links a single point position in the two coordinate systems. In an embodiment, the Risapoint information is stored in a data store. (See the description with regard to FIG. 15.)

Figure 15:
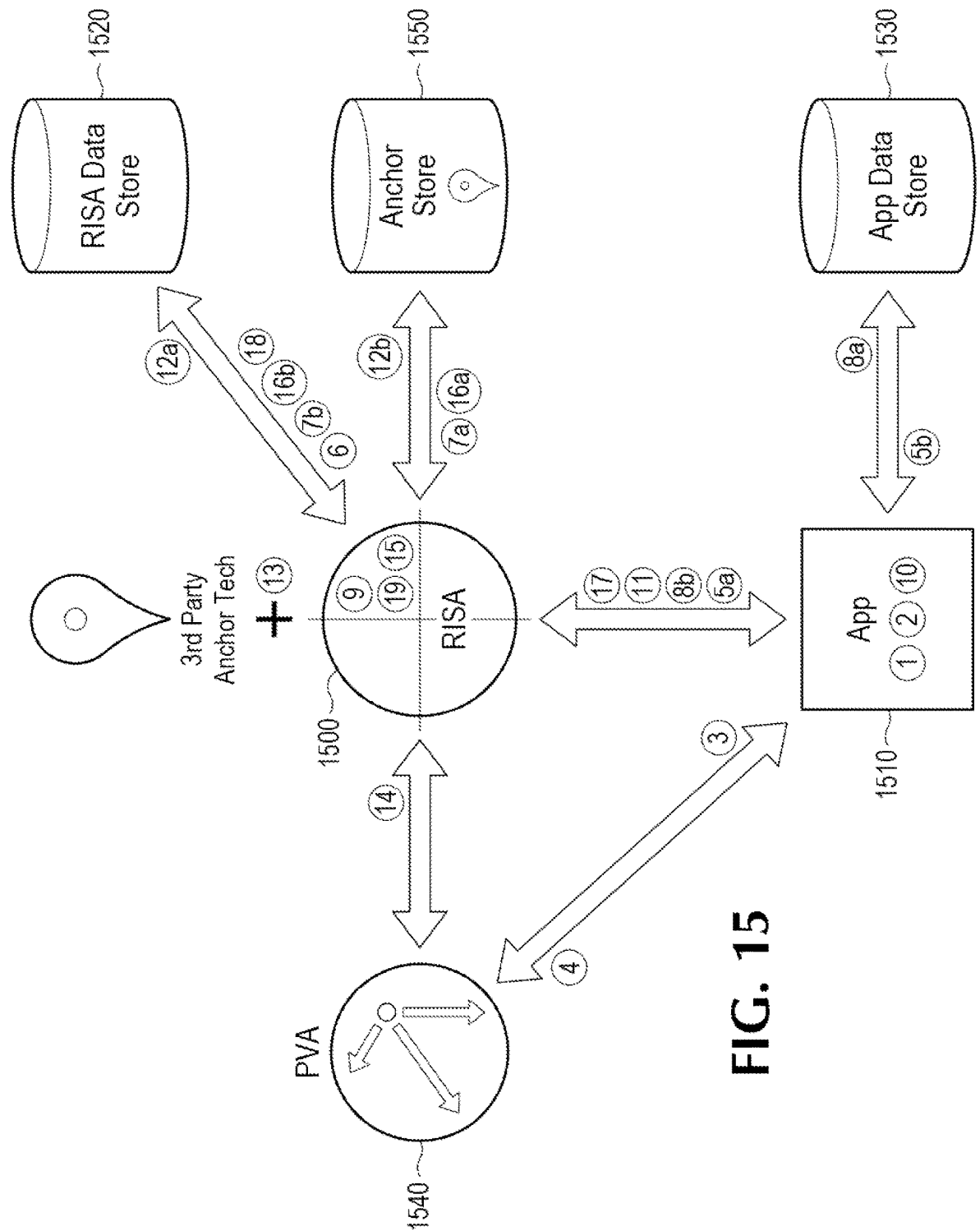
FIG. 15 is a simplified communication diagram illustrating principal communications during utilization of the present invention in some embodiments.

RISAPoints are created automatically by the RISA software. To do so, the RISA process may utilize commercially available external technology. More specifically, RISA tracks RISA points, and it may utilize external anchor technologies to create and manage a corresponding anchor for each RISA point. AR examples of available anchor technologies include Azure Spatial Anchors, ARKit's ARAnchors, Hololens WorldAnchor etc. In FIG. 15 discussed below, these kinds of anchor technologies are identified generically as "$3^{rd}$ Party Anchor Tech." A RISAPoint and the corresponding anchor can be used to provide an associated pair of location points for PVA.

In an embodiment, RISAPoints are created by RISA whenever alignment has already been established and is active. RISAPoints are used by RISA to find alignment initially, and to update active alignment as the application operates. RISAPoints are continually refreshed, being improved and replaced with new data, as long as alignment is currently active.

RISASite and RISAcells

RISASite is the definition of an area (or volume) of effect. It includes all space that might potentially be processed simultaneously by the RISA system. RISA makes cells and points (see below) only within that area and only acts on them as they relate to other elements within that RISASite. RISASite definitions include rules for size, (all rectangular prisms), cell density, and optional global location information. These definitions may be stored in a data store as described below with regard to FIG. 15.

RISASites generally contain a 3D array of RISACells evenly distributed through the site according to the site's density. The cells correspond to physical spaces but actually exist only as data, for example, in the RISA Data Store (1520), associated to the RISASite that contains them. RISACells are illustrated in one example in FIG. 11 (2D grid), and in FIG. 14A (for example, 3D grid 1414), described in more detail below.

RISACell is a "home" for one or more subordinate points and long-term storage of data about previous activity in that cell and its points. This data is stored in a data store associated to the corresponding RISACell. RISACells include stored data that indicates when they were last updated, and the location (relative to the cell) of their RISAPoint(s). Preferably, they do not store the information required to perform alignment. The data used for alignment is held in discrete points ("RISAPoints") distributed throughout the active volume. Each point is only responsible for a part of the process and relies on the other points for both alignment and repair. Further, every point can be used for each job interchangeably. That is, in a preferred embodiment, any RISAPoint has equal potential to align, and to repair other points. Further, in an alignment event, any RISAPoint could potentially serve as translation point, rotation point, etc.

Figure 11:
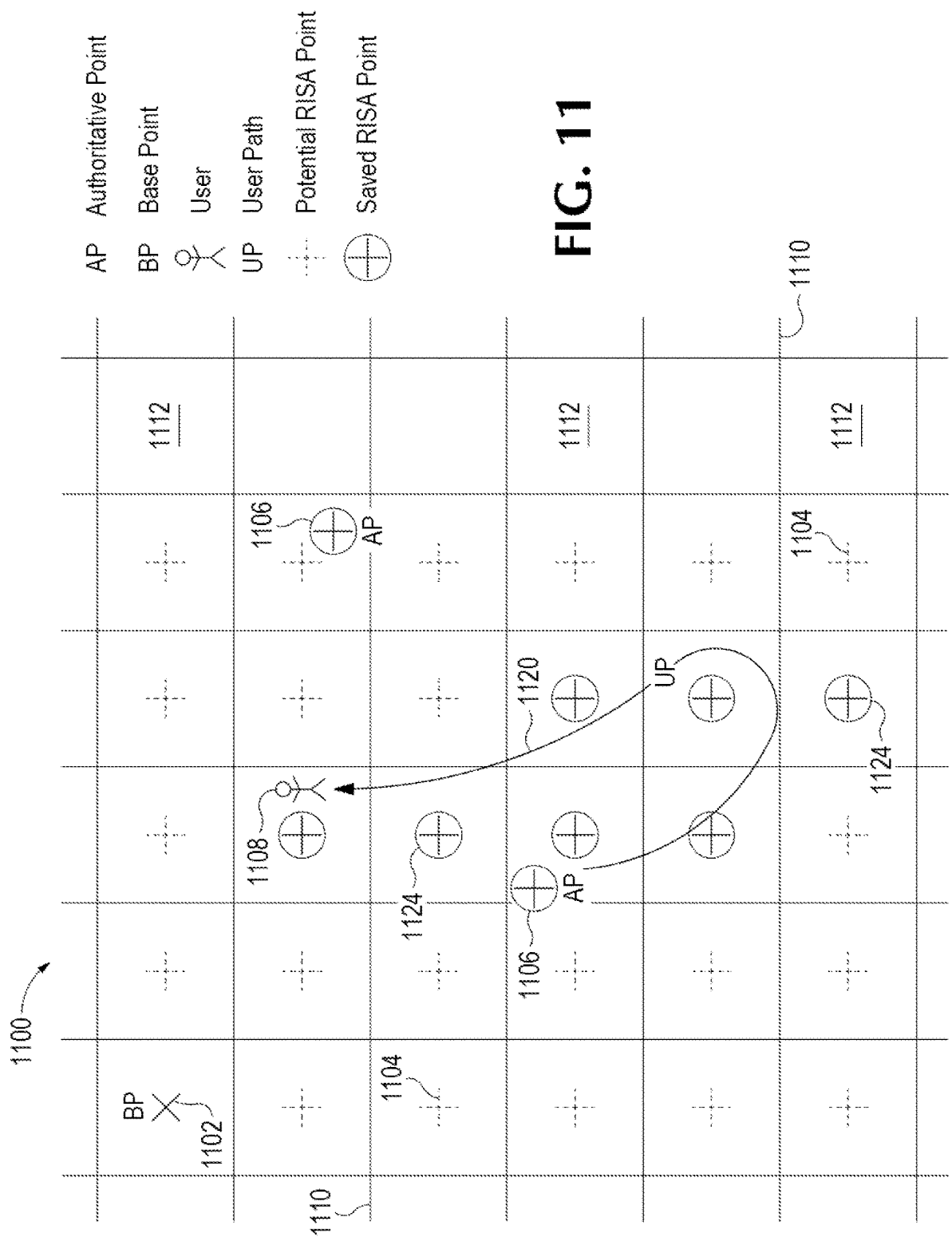
FIG. 11 is a conceptual diagram illustrating a user (device) moving about in a 2D grid of cells during a session.

FIG. 11 is a conceptual diagram illustrating operations during a session to generate (capture and save) a network of new alignment points, aka RISAPoints. The drawing diagram illustrates an area or scene 1100. The scene may correspond to a physical space such as a room or floor of a building under construction. The scene appears in 2D for clarity. The drawing indicates a project base point ("BP") 1102. In an embodiment, potential RISAPoints 1104 may be instantiated from the base point 1102. The potential points 1104 are each indicated by a dashed cross or target in the center of the corresponding grid cell. That is, in some embodiments, the center of the cell may be a default location of the corresponding potential alignment point. There may be other alignment points in a cell. In a preferred 3D use case, the points may be located on an imaginary grid on or near the floor of a physical space, and there may be a second grid near the ceiling of each level.

In this figure, there are two authoritative association points (AP) 1106 and a user 1108. The user 1108 wears or carries a suitable AR device. An imaginary grid 1110 defines individual cell areas, for example, 1112 (three of them are identified). The processor (software) defines this grid 1110 based on the physical area. Preferably the cells are rectangular and may be square. It creates enough cell areas to provide sufficient resolution of points for a desired accuracy and resilience of alignment. For example, we have found that a number of individual cells in a range of approximately 30-50, and preferably around 40, is adequate for one floor of a building. As one example, if a floor of building site is 60×60 feet (3600 square feet), then a 6×6 grid evenly divided would create 36 cells, an adequate number for present purposes.

Referring again to FIG. 11, a line 1120 indicates one example of a route of the user/device moving around in the physical space. The motion route indicated by line 1120 is not critical; it may be more or less random. The grid 1110 does not have to be uniform or rectilinear; it merely defines a collection of evenly-spaced sub-spaces or cells in the subject physical space. Each cell may define an association point as noted.

During an operating session, as the device moves along the route indicated by line 1120, each time the device enters a cell area, an application "looks for" an association point, by comparing what is in view to the previously stored data. The application may send current scanner data to a local or external (remote) anchor service and update a list or queue of points to look for in the anchor store (a "watching" method). As discussed below, if and when the anchor service detects a matching anchor in its datastore responsive to the current scanner (or camera) data, it fires an event and reports location of the matching anchor according to its datastore. The matched location points are provided to a PVA process or the like to generate a transform to align the digital model to the physical space in view.

Figure 10A:
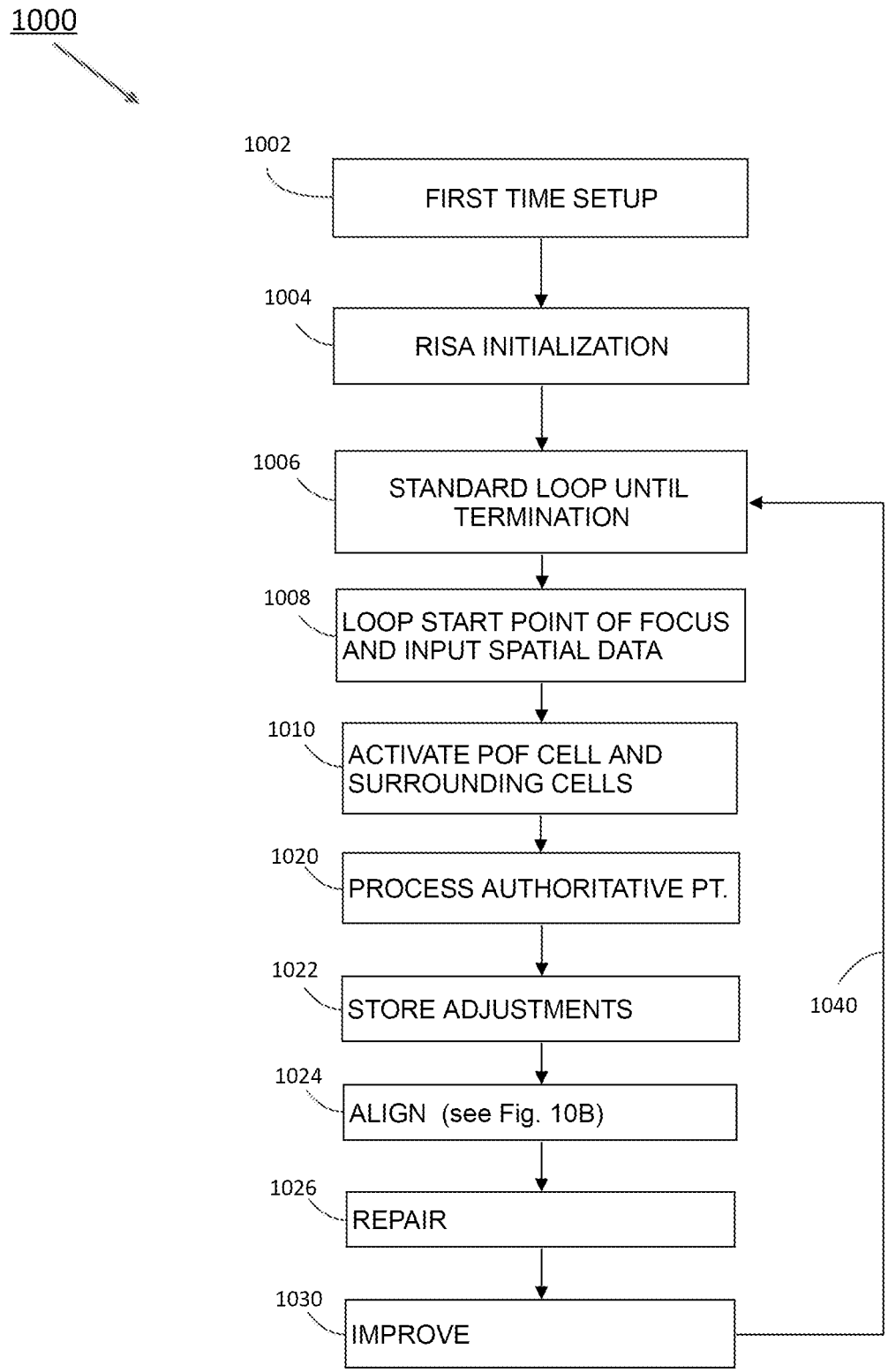
FIG. 10A is a simplified flow diagram of a process to utilize resilient interdependent spatial alignment to improve and maintain spatial alignment between two coordinate systems.

FIG. 10A is a simplified flow diagram of an example process 1000 to utilize a resilient interdependent spatial alignment process to improve and maintain spatial alignment between two coordinate systems. This figure provides a high-level overview; the steps are described in more detail below.

A. First Time Setup

Referring to FIG. 10A, block 1002 represents an initial setup process. In aligning two coordinate systems in general, one is designated as the lead coordinate system and one is designated as the follow coordinate system (or follow-Space). Initial alignment may be initiated explicitly by an application or user. This may be done by passing minimum information to execute a first PVA alignment. By default, that minimum information includes a translation point (AAP), a normalized vector (sensor, AAP, or other), and a rotation point (AAP). PVA is explained in detail above. This establishes a "soft" pliable alignment centered on the translation point as the Point of Focus. RISA can translate a hard alignment created by any other alignment method to a soft RISA alignment by then declaring the starting Point of Focus.

B. RISA Systems Initialization

Referring again to FIG. 10A, block 1004 represents a RISA initialization process. After a new setup, RISA creates the systems that manage alignment and store alignment data. First, RISA creates (or loads) the RISASite within which it will handle alignment. That site's scale and density will be defined according to the needs of the use case. Storage of alignment data is described below with regard to FIG. 15.

The boundaries of the RISASite should extend far enough that it will have plenty of points with which to maintain alignment, but not so far that the points will be too difficult to manage or will interfere with each other. The density controls how many RISACells a particular site contains. Some applications may want to move fluidly between RISA-Sites during use. Moving between sites is discussed below. After RISA initialization, block 1004, the process begins a standard loop operation at block 1006. This begins with identifying the starting point of focus and acquiring spatial data at that location, block 1008.

The RISACells are generated within the RISASite(s). The cells are generated in an even grid throughout the volume of the site according to the stated density. The cells at the time of initial setup are essentially areas of potential focus and alignment. Each cell creates at least one RISAPoint to handle alignment. The RISAPoints are created within the cell containing the point of focus, and its surrounding cells, block 1010. A strategy may be applied to limit the option of saving new anchors to the areas most likely to have reliable data. In one embodiment, the code may check the current cell and 3D adjacent cells (+1/−1 in 3 axes). This checks for adequate data in the cells, and especially for a matching point (anchor) returned for that cell. In some embodiments, a distance limitation relative to the point of focus may be applied. One metric of "reliable data" may be a confidence level returned by an anchor data store.

C. Adjustment

Next in the loop flow diagram is to process an authoritative point, block 1020. During a standard loop (1040), the introduction of an authoritative point of association affects an alignment adjustment. The authoritative point may be introduced by recognizing it (for example, from sensor input data) or air-handle or similar interface input. Adjustments based on an authoritative point are stored as modifiers to the surrounding cells, preferably decaying by distance from the POF, block 1022. This "distance" is not simply "as the crow flies" but rather an effective distance determined by a pathfinding algorithm. In one embodiment, an adjustment factor may be saved to a cell as a 3D vector representing the delta position between the position of the authoritative association point in lead coordinate system vs in the follow coordinate system. These adjustments may be stored in the cell until they are applied to RISAPoint during a loop operation (see below). In this way, each authoritative point in the site may be leveraged to improve the accuracy of many or all subordinate points in the site. Those modifiers are applied before being sent to PVA. The position of the lead point (stored as a 3d vector) has modifiers (also 3d vectors) applied by straightforward vector addition then the result is sent to PVA. Those modifiers are stored individually within each cell to allow individual undo but are all applied together before sending to PVA.

D. Loop for Continuous Align, Repair, and Improvement

Loops 1040 may continue regularly whenever RISA is in an active state. RISA is active when initial setup has taken place, data feeds are present, and a focus point is declared within a RISASite. (Start of loop takes updated point of focus and spatial data, as noted at 1008.)

A cell containing the current point of focus and the surrounding cells (as well as their point(s)) are activated. This means that those cells' points are included in the collection that the loop acts on. So, in querying the anchor store to find the points, the process will only query for points within the active cells. Further, our process will only repair points within active cells. etc. The only actions that happen to cells outside that focus point adjacency are that anchors that have already been located can be used as the far points in PVA alignment, and new adjustments can be applied to cells outside that limit if the decay reaches them. All points with adequate data for use for example, those having sufficient high contrast feature points to create an effective anchor, are included in evaluation and weighing for the following tasks; align, repair and improve.

Alignment will be determined by sending input data to PVA and receiving a translation in return. That translation is used to move (align) the followSpace. Alignment requires first a translation point for PVA. The best translation point is determined by a weighted scoring according to the formula: $S=Q/(P*P')/(A*A')(X*X')$ where:

S=Score
Q=point quality. Out of 1. Adapted for whatever technology is used to create the point.
P is a pathfinding distance
P' is weight coefficient
A=Age of the saved point data
A'=Age weight coefficient
X=optional factors particular to the use case
X'=weight coefficient Angle (rotation) Point for PVA is selected by score weighted by the following similar formula: $S=Q*(D*D')/(A*A')(X*X')(P*P')$ Finally, the Vector for PVA may be taken from a sensor particular to the use case, or a point is selected from which to derive the normalized vector using the same formula as for the rotation point but where D=sin PTR*Td, where PTR=the angle between line segments from point in question to the translation point, and from the rotation point to the translation point, and Td is the distance from the translation point to the point in question. This geometry was further described above in the PVA discussion. Once points are weighed (scored) and selected, the follow coordinate system is moved to align by the PVA along with any modifiers on the points.

Repair. If enough data is present that we would expect a point to be recognized, but it is not, that point is marked for repair. In the next loop, the point is deleted or archived and replaced with a new point in the same location; block 1026. However, this new point preferably is saved with the adjustment modifiers already applied to it so the adjustment modifiers may be deleted on that point. In this way it reflects the best (most accurate) data available.

Improve. Similar to the repair step, there is a threshold to replace points with new data if a specified time has passed since their creation or if higher quality data has been gathered since the point was saved. Quality of data (an anchor point) can be reported by third party cloud services.

Again, the new point is saved with the present alignment, with the adjustment modifiers applied and discarded. In an embodiment, the adjustment may be stored with the anchor metadata; each anchor stores the adjustment along with its own (for example 0-1) score associated with that adjustment.

Figure 10B:
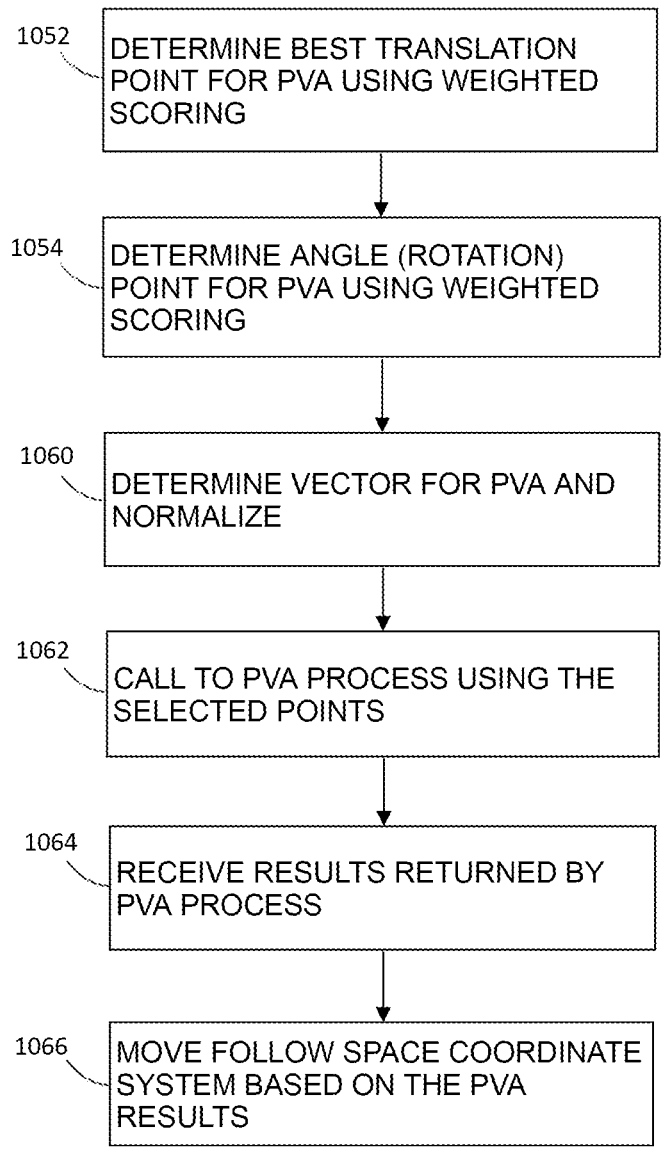
FIG. 10B is a simplified flow diagram illustrating the alignment process of FIG. 10A.

FIG. 10B is a simplified flow diagram illustrating the alignment process of FIG. 10A. At block 1052 is determining a best translation point for PVA using weighted scoring as described above. Similarly, at 1054, determine angle (rotation) point for PVA using weighted scoring also described above. Finally, determine vector for PVA and normalize, block 1060. This was described in more detail above in the PVA section. Then the RISA process makes a call to the PVA process, block 1062, using the determined parameters. The RISA process receives the information returned from PVA, block 1064. See the description of FIG. 15 for more detail of a preferred implementation. Finally, at block 1066, the RISA process or app moves the follow space coordinate system based on the pva results. Now the followSpace, for example, a digital model, is precisely (or once again) aligned to the actual scene in view of the device.

FIG. 13 is a simplified block diagram of a portable AR device and selected software components arranged according to one embodiment of the present disclosure. FIG. 13 is a simplified block diagram of a portable AR device and selected software components arranged according to one embodiment of the present disclosure. The device, also called a system herein, may include a headset 1304 comprising an AR headset similar to the Microsoft HoloLens2™ device, commercially available. Electronics 1300 may be integrated into the headset. In some embodiments, the electronics 1300 may be in a separate unit coupled to the headset by a wired or wireless connection. It can also exist on mobile devices with no headset at all. The separate unit may comprise a smartphone, tablet computer, etc.

The electronics 1300 includes at least one processor 1310 coupled to suitable memory 1324. The memory stores various code executable in the processor to accomplish the functions described herein. The software components may include an inspection application 1328 and other applications. The software components may further include a RISA or alignment point manager, 1330, to carry out point generation, storage, matching, updating, etc. It also comprises communications hardware and software 1340 for network communications, for example, to cloud computing assets.

In one preferred embodiment, plural anchor managers are provided. These manage anchor points, each using a different technology. For example, one anchor manager 1332 may implement Azure Spatial Anchors while another manager 1334 implements Google's ARCore Cloud Anchors. These technologies and others aim to provide open AR data across various platforms and applications. In one preferred embodiment of the present disclosure, whenever an association is created for an authoritative or subsidiary point, we utilize multiple of these different anchor technologies working together with each other.

Alignment Across Multiple Physical Sites

As a practical matter, the physical area being processed in a given session must be bounded, i.e., finite in size. In addition, embodiments of the present alignment processes must serve a variety of scales without conflict. That is, it should be possible to flow between RISA sites that were built at different scales. To that end, we propose a system to define and manage multiple different volumes (physical spaces) within a larger context. A simple analogy may be mapping cities within a county and counties within a state.

Some cities within a county may border one another. Different scales are useful if not essential in such contexts. We use the term RISASite to mean a definition of a physical volume within which RISA is functioning. A RISASite carries parameters defining scope, scale, location of the RISAsite within its larger context, privacy/access modifiers, and a RISAsite's relationship to other sites within its area.

The grid of cells described above exists within one RISAsite. Within that site, the cell size/density is chosen based on the use case. To illustrate, drone piloting would use a much larger scale than construction, which would be larger than manufacturing. When an application using RISA starts up, the application must select an active volume to begin querying data within that site. For example, in construction, a user can select a building, and a floor and that floor may be one RISAsite. RISA can then begin its usual function within that site.

RISASites can be adjacent to or nested within each other, and since they each have information about their positions relative to the world and therefore relative to each other, the application can use the exit point from one RISAsite to inform the entry point into the other. In one embodiment, when passing between RISASites, the AR device's position and rotation are passed directly and RISA initiated with no points necessary. RISA then immediately begins searching for the expected SAPs in the new RISASite and running through standard RISA loops as described above.

RISASites can be co-located at the same or different scales. One RISA site can exist wholly or partially within another with the freedom to scale jump as the user travels between sites. For example, when a device leaves a construction site, the application switches to the neighborhood scale RISASite with coarser location but maintains uninterrupted service. RISASites are self-contained and their location is non-static. One RISASite could be designed to define the bounds of a vehicle, with consistent locations within the vehicle, but a frequently changing location of the RISASite itself.

Figure 14A:
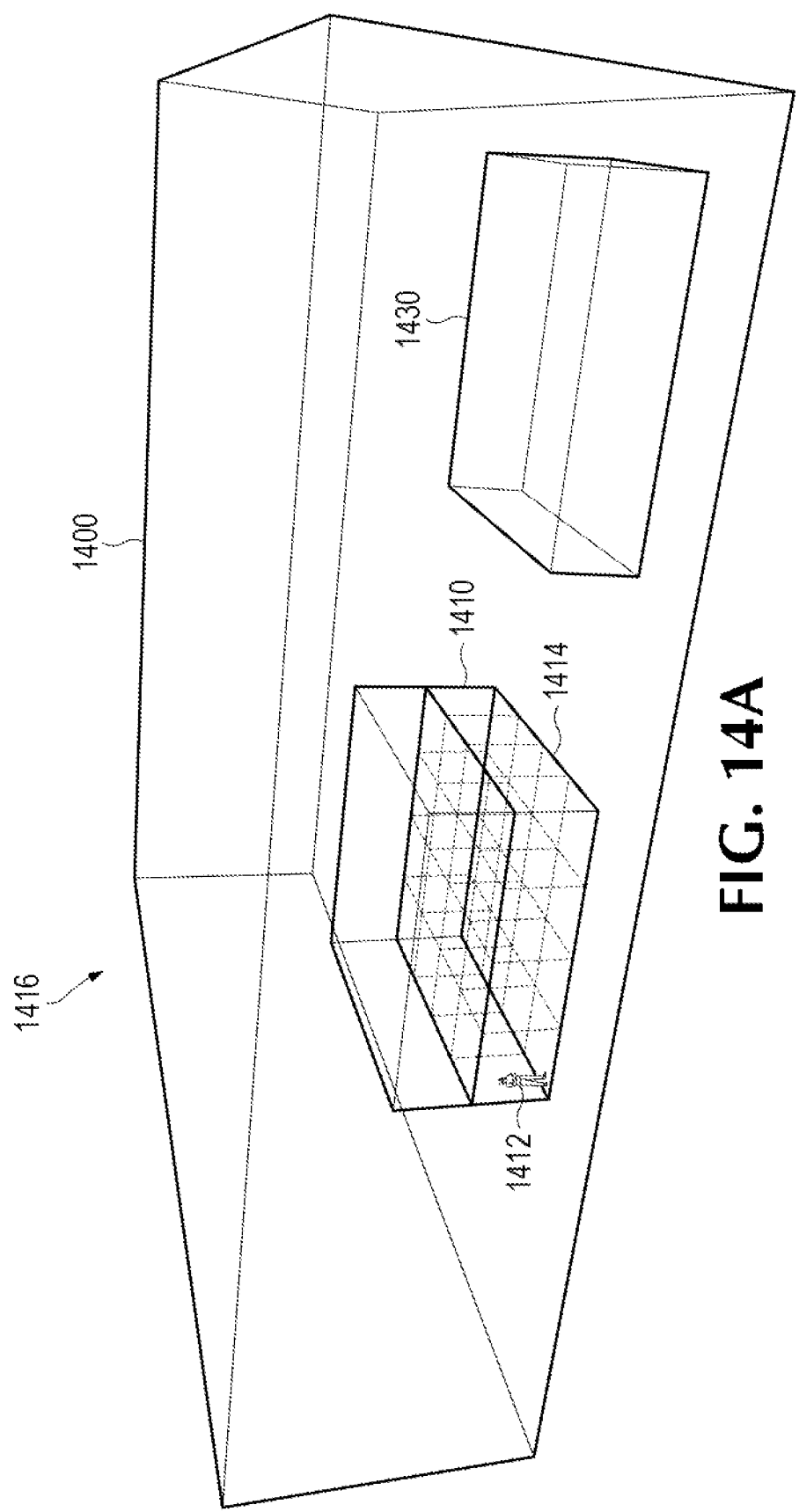
FIG. 14A is a conceptual illustration of a physical volume that includes three individual sub-volumes (RISASites) inside of the physical volume.

FIG. 14A is a conceptual illustration of a physical volume 1400 that includes three individual sub-volumes inside of the physical volume 1400. A RISASite may be defined for each sub-volume. The dotted lines represent the edges of the cells of the RISASite that is active in that application (device) at that moment, and the hardlines represent the edges of a RISASite. A first sub-volume 1410 (RISASite) is indicated by the appearance of a user (or device) 1412 and a rectilinear grid 1414 of cells 816, etc. The visible grid 1414 in this diagram indicates that the corresponding RISASite 1410 is "active," meaning the device has identified it (located itself within that volume) and it is using (and updating) the RISA points within that volume as the device is moved about.

Figure 14B:
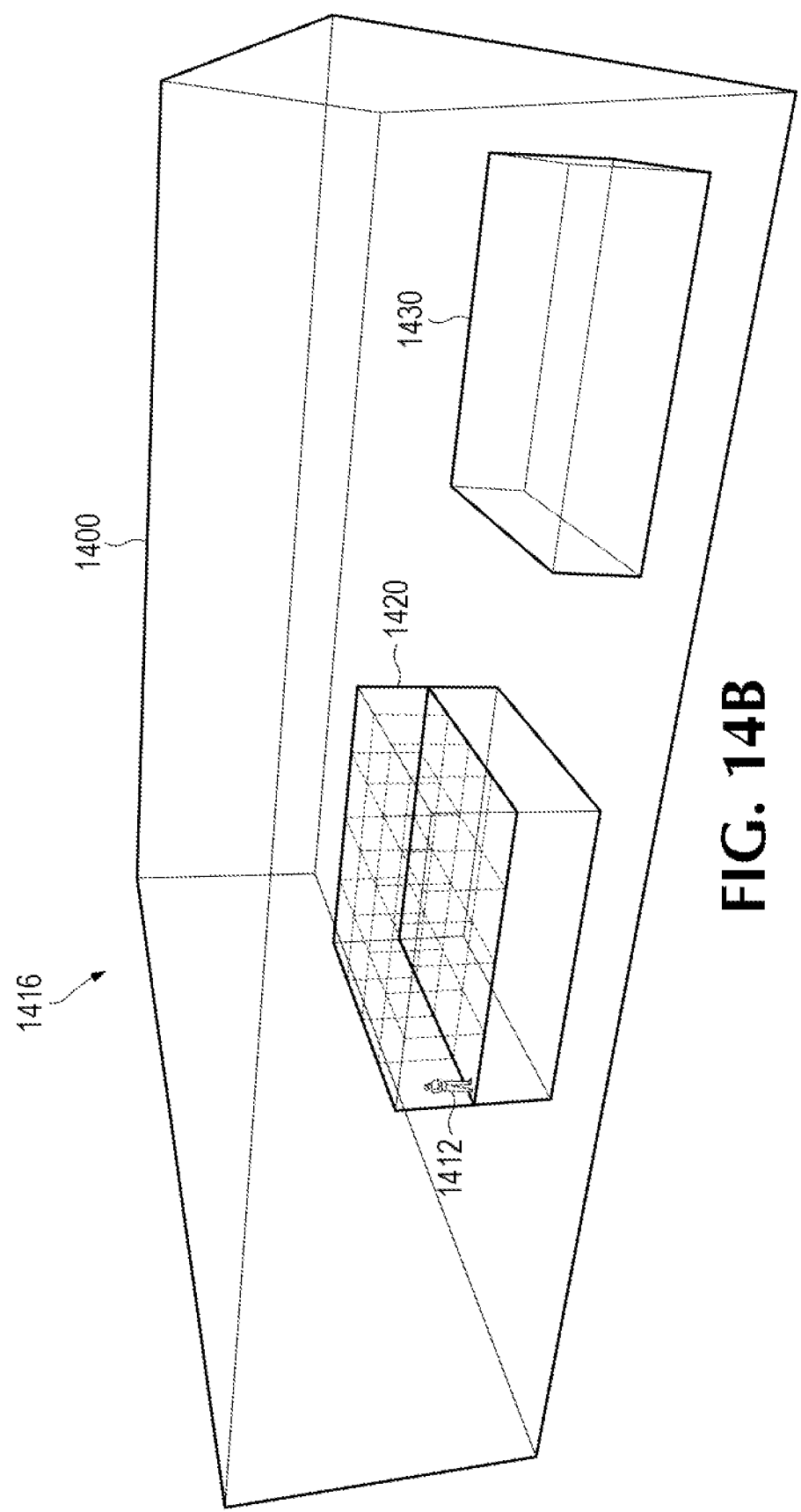
FIG. 14B illustrates the volume of FIG. 14A in which a user (device) has moved from a first site (lower floor) to a second site (upper floor) located adjacent to (above) the first site.

FIG. 14B illustrates the volume of FIG. 14A in which the user (and device) has moved from the first site (lower floor) identified by the grid of site 1410 to a second site (upper floor) located adjacent to (above) the first site and indicated by a second grid 1420. In a preferred embodiment, the device detects the exit point (location) from sub-volume 1414 and uses that information to inform the entry point into the upper floor, second grid 1420. It passes control to utilize the data for that sub-volume and continues the "RISA loop" process, i.e., using (and updating) the RISA-points within that volume as the device is moved about within it. In this way, it employs the data, including scale, associated with that volume or space.

Figure 14C:
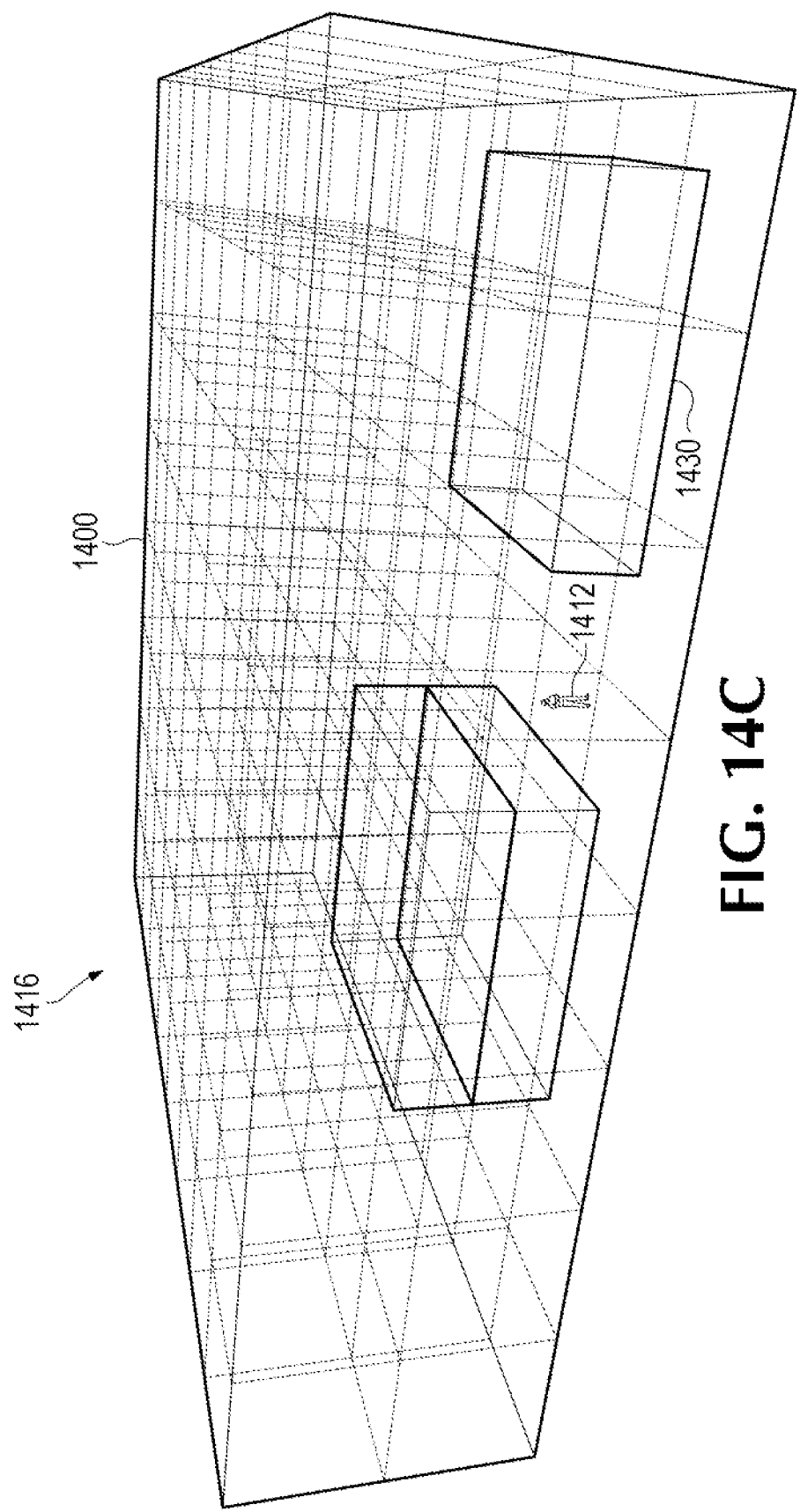
FIG. 14C illustrates the volume of FIG. 14A in which a user (device) has exited the second site but not entered a third site, the device remaining inside the defined physical volume.

FIG. 14C illustrates the volume 1400 of FIG. 14A in which the user (device) 1412 has exited the site 1410 but not entered a third site or sub-volume 1430. The user (device) is still located within the volume 1400 of the larger physical object. Accordingly, the device notes the exit location from 1410 and uses that to initially set its entry location within the larger volume 1400. It passes control to utilize the data for that volume and continues the "RISA loop" process, i.e., using (and updating) the RISA points within that larger volume as the device is moved about within it. In this way, it employs the data, including scale, associated with that larger volume. If and when it moves into a sub-volume, say 1430, it will again know its entry point location, and switch over to the dataset for that sub-volume.

In some embodiments, RISASites can be public and shared not just between users, but even between applications and use-cases, or they can be made private and only be accessible to those with access. An application requiring private RISASites can be informed by public RISASites but cannot contribute data to them.

FIG. 15 is a simplified communication diagram illustrating principal communications during utilization of the present invention in some embodiments. In this diagram, a RISA system or process 1500 is provisioned in accordance with the present disclosure. An application program 1510 is configured to utilize RISA technology as follows. Process steps and or communications listed below are identified by corresponding circled numbers in the drawings:

1. Application 1510 starts. A first-time setup process may include the following steps.
2. By interface, the app acquires minimum info for a single PVA alignment (for example, by manually setting 3 points and their corresponding locations. "PVA" is described above in a preferred embodiment and it also refers to any other solution that can receive point location pairs and return a transform to align two associated coordinate systems. These points refer to locations in a lead space, say a physical location acquired by a sensor, and corresponding points in an associated follow space, say a 3D region in a digital model.
3. Application 1510 delivers PVA request Data to a PVA process 1540. The PVA (or equivalent) may be implemented, for example, as a software process or method, callable by the application 1510. It may be embedded in the application or provisioned remotely.
4. PVA 1540 returns a transform to App 1510 for initial alignment.
5a. App 1510 sends request to RISA 1500 for a new RISA site, delivering necessary parameters (scale, density, rough global location, etc.) and
5b. App saves new RISA site identifier (id) in App Data Store 1530 for future sessions.
6. RISA Initializes the new RISASite. Saves definition data to RISA Data Store 1520.
7. RISA creates new anchors in each adjacent cell with adequate data. In more detail, RISA process 1500 creates the new anchors by saving the pure anchor data in Anchor Store 1550 (7a) and saving the anchor's metadata to tie it to the alignment process in RISA Data Store 1520 (7b). The content of the pure anchor varies by the external tech used. A Hololens worldAnchor, for example, vs an iOS ARAnchor probably contain different data in their core but the critical definition is this: The "pure anchor" requires only the data necessary for that anchor to be recognized in a future session and correctly place a transform in its proper location relative to the session's global coordinate system. Anchor metadata generally includes the following elements:

the anchor's intended location relative to the follow-Space (this is the second half of the paired points used for a PVA event).

age of the anchor adjustment modifiers (based on authoritative alignment points) Alternatively, adjustment modifiers may be stored in the corresponding cell.

source of the anchor (platform etc.)

estimated quality based on distance, sensor exposure time, etc.

Again referring to FIG. 15, a New Session in an existing site may proceed as follows:

8a. Application 1510 gets stored RISA information for the existing site from App Data Store 1530, delivers site ID to RISA 1500 (8*b*) and prompts RISA initialization of the new session.

9. RISA begins attempting alignment loop (below) using rough location as point of focus.

10. If no anchors are found, App 1510 can fall back on steps 2, 3, 4, 7 above, then begin loop.

An example alignment loop proceeds as follows:

11. App delivers a point of focus to RISA 1500. In general, this may be where the sensor thinks it is currently located. It is the location where alignment precision is most important. In an AR application, that is the camera location. In a more abstract usage (e.g., automatically aligning photogrammetry to a BIM model in a pure desktop app) it may be the virtual camera location, or the location where measurements are being taken. If RISA isn't currently in a "green" (fully functional, active) state, it might be the rough location found by gps or similar means.

12a. RISA pulls data from RISA Data Store 1520 for anchors near the delivered point of focus location.

13. RISA uses 3rd party anchor services to attempt to find saved anchors in leadSpace (e.g., physical). In an embodiment, the 3rd party services are comparing saved anchors with current sensor data. To that end, there may be provisioned an ongoing communication process between the App (which is coupled to acquire sensor data) and the 3rd party anchor services, (typically cloud-based). If the services find that some portion of the current sensor data matches a saved anchor, then that anchor is 'located' or 'found' and its position in the arbitrary global coordinate system may be reported. The stored metadata (see step 7b) contains the expected relative location. Accordingly, those two locations (matched pair) can be used as lead and follow points (respectively) in a PVA alignment.

14. If such anchors are found, RISA 1500 delivers strategically selected anchors to PVA 1540 for alignment event. These anchors or points preferably are "strategically selected" using the strategy (and formulae) described above.

15. RISA applies transform result from PVA to follow space coordinate system, along with modifiers. See "Modifiers" aka adjustment vectors described above, resulting from authoritative points.

16. RISA then saves new anchors to the Anchor Store 1550 and RISAData Store 1520 as necessary to expand, repair or refine alignment.

Adjustment Preferably Proceeds as Follows:

17. App interface associates a point in both leadSpace and followSpace and sends two coordinates to RISA. For example, an interactive holographic display may enable a user to link a selected point in lead and follow space.

18. RISA saves adjustments in RISA Data store associated with anchors.

19. When Anchors are replaced, their adjustments are applied to the replacement and removed.

Equipment and Software

Most of the equipment discussed above comprises hardware and associated software. For example, the typical electronic device is likely to include one or more processors and software executable on those processors to carry out the operations described. In particular, capture devices such as discussed above are commercially available. Capture device cameras and sensors may be integrated into a wearable apparatus. One example is the Microsoft HoloLens head-mounted display. We use the term software herein in its commonly understood sense to refer to programs or routines (subroutines, objects, plug-ins, etc.), as well as data, usable by a machine or processor. As is well known, computer programs generally comprise instructions that are stored in machine-readable or computer-readable storage media. Some embodiments of the present invention may include executable programs or instructions that are stored in machine-readable or computer-readable storage media, such as a digital memory. We do not imply that a "computer" in the conventional sense is required in any particular embodiment. For example, various processors, embedded or otherwise, may be used in equipment such as the components described herein.

Memory for storing software again is well known. In some embodiments, memory associated with a given processor may be stored in the same physical device as the processor ("on-board" memory); for example, RAM or FLASH memory disposed within an integrated circuit microprocessor or the like. In other examples, the memory comprises an independent device, such as an external disk drive, storage array, or portable FLASH key fob. In such cases, the memory becomes "associated" with the digital processor when the two are operatively coupled together, or in communication with each other, for example by an I/O port, network connection, etc. such that the processor can read a file stored on the memory. Associated memory may be "read only" by design (ROM) or by virtue of permission settings, or not. Other examples include but are not limited to WORM, EPROM, EEPROM, FLASH, etc. Those technologies often are implemented in solid state semiconductor devices. Other memories may comprise moving parts, such as a conventional rotating disk drive. All such memories are "machine readable" or "computer-readable" and may be used to store executable instructions for implementing the functions described herein.

A "software product" refers to a memory device in which a series of executable instructions are stored in a machine-readable form so that a suitable machine or processor, with appropriate access to the software product, can execute the instructions to carry out a process implemented by the instructions. Software products are sometimes used to distribute software. Any type of machine-readable memory, including without limitation those summarized above, may be used to make a software product. That said, it is also known that software can be distributed via electronic transmission ("download"), in which case there typically will be a corresponding software product at the transmitting end of the transmission, or the receiving end, or both.

It will be obvious to those having skill in the art that many changes may be made to the details of the above-described embodiments without departing from the underlying principles of the invention. The scope of the present invention should, therefore, be determined only by the following claims.

The invention claimed is:

1. A computer-implemented method to continuously maintain and improve alignment between two associated coordinate systems, by moving a follow coordinate system to align it to a lead coordinate system during a session, the method comprising the steps of:
   executing a software loop process comprising the steps of:
      identifying and activating a first cell in a leadSpace coordinate system, wherein the leadSpace coordinate system is one of the two associated coordinate systems;
      automatically selecting and activating surrounding cells near a point of focus according to a relative position of the surrounding cells to the point of focus;
      acquiring three points within the leadSpace coordinate system and corresponding locations in a followSpace coordinate system, wherein the followSpace coordinate system is the second associated coordinate system of the two associated coordinate systems;
      receiving a transformation for alignment of the two associated coordinate systems at the point of focus; and
      moving the followSpace coordinate system to align to the lead coordinate system at the point of focus.

2. The method of claim 1, further comprising acquiring spatial data at a location of the point of focus, wherein acquiring spatial data includes provisioning a device in a physical space corresponding to the first cell and operating the device to acquire the spatial data.

3. The method of claim 1, wherein the acquired three points are processed for alignment, wherein processing for alignment comprises:
   ignoring points with inadequate data;
   scoring the remaining points to select a best translation point for alignment;
   scoring the remaining point to select an angle of rotation point for the alignment; and
   determining a vector for the alignment.

4. The method of claim 3, wherein determining the vector for alignment includes acquiring the vector from a sensor.

5. The method of claim 4, wherein a followSpace point is identified by vector subtraction.

6. The method of claim 1, wherein the leadSpace coordinate system is in a physical location.

7. The method of claim 1, wherein selecting and activating surrounding cells that are adjacent to the first cell includes checking the cells located +1/−1 in 3 axes.

8. The method of claim 1, wherein selecting and activating surrounding cells that are adjacent to the first cell includes limiting the selection of adjacent cells by applying a pathfinding distance limitation relative to the point of focus location.

9. A computer-implemented initial setup method for a resilient interdependent spatial alignment (RISA) process to replace invalid anchors comprising:
   retrieving anchor metadata comprising:
      an intended location of an anchor point relative to a followSpace coordinate system,
      age of the anchor point,
      source of the anchor point;
   identifying the anchor point in a leadSpace, wherein if the anchor point is not identified, it is no longer valid;
   saving identified anchor points; and
   automatically creating new anchor points to replace invalid anchor points, wherein automatically creating new anchor points comprises:
      identifying a point of focus in the leadSpace;
      replacing the invalid anchor point with a new anchor point characterized by a corresponding location and an identifier; and
      storing the new anchor points in a datastore for subsequent use to improve and maintain alignment between two associated coordinate systems.

10. The method of claim 9, wherein the new anchor point comprises data from surrounding cells and points.

11. The method of claim 9, wherein the leadSpace has been altered.

12. The method of claim 9, comprising:
    selecting the point of focus;
    querying an anchor store to identify anchor points in a cell containing the selected point of focus and in surrounding cells;
    replacing anchor points if a threshold time has passed since creation.

13. The method of claim 9, comprising:
    selecting the point of focus;
    querying an anchor store to identify anchor points in a cell containing the selected point of focus and in surrounding cells;
    replacing anchor points if higher quality data is available for a specific data point.

14. A computer-implemented initial setup method for a resilient interdependent spatial alignment (RISA) process to modify an anchor point comprising:
    inputting authoritative points;
    retrieving anchor metadata from an anchor store for the anchor point in a cell adjacent to an authoritative point of the authoritative points, wherein the anchor metadata comprises:
       an anchor point's intended location relative to a followSpace,
       age of the anchor point, and
       source of the anchor point; and
    modifying the anchor point based on the authoritative points, wherein a modification vector decays by effective distance.

15. The method of claim 14, wherein the authoritative point is a visual marker.

16. The method of claim 14, wherein the authoritative point is sensor data.

17. The method of claim 14, wherein the effective distance is determined by a pathfinding algorithm.

* * * * *